(12) United States Patent
Peterson et al.

(10) Patent No.: US 8,018,457 B2
(45) Date of Patent: *Sep. 13, 2011

(54) RAY TRACING SYSTEM ARCHITECTURES AND METHODS

(75) Inventors: Luke Tilman Peterson, Oakland, CA (US); James Alexander McCombe, San Francisco, CA (US); Ryan R. Salsbury, San Francisco, CA (US); Steven John Clohset, San Francisco, CA (US)

(73) Assignee: Caustic Graphics, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/555,766

(22) Filed: Sep. 8, 2009

(65) Prior Publication Data

US 2009/0322752 A1    Dec. 31, 2009

Related U.S. Application Data

(63) Continuation-in-part of application No. 12/408,478, filed on Mar. 20, 2009, now Pat. No. 7,830,379, which is a continuation-in-part of application No. 11/856,612, filed on Sep. 17, 2007, now Pat. No. 7,969,434, which is a continuation-in-part of application No. 60/826,201, filed on Sep. 19, 2006, said application No. 12/408,478.

(60) Provisional application No. 61/095,890, filed on Sep. 10, 2008, provisional application No. 61/229,258, filed on Jul. 28, 2009, provisional application No. 61/229,705, filed on Jul. 29, 2009.

(51) Int. Cl.
*G06T 15/50*    (2011.01)

(52) U.S. Cl. .......... 345/426; 345/420; 345/422
(58) Field of Classification Search .......... None
See application file for complete search history.

(56) References Cited

U.S. PATENT DOCUMENTS 4,625,289 A * 11/1986 Rockwood .......... 345/422
(Continued)

FOREIGN PATENT DOCUMENTS

WO    WO/96/17326 A1    6/1996
(Continued)

OTHER PUBLICATIONS

Gerhard Hummer, Lawrence R. Pratt and Angel E. Garcia, "On the free energy of ionic hydration," The Journal of Physical Chemistry, 1995 (Available online at http://arxiv.org/PS_cache/chem-ph/pdf/9505/9505005v1.pdf, last visited Oct. 30, 2009).

(Continued)

*Primary Examiner* — Said Broome
(74) *Attorney, Agent, or Firm* — Michael S. Garrabrants; Novak Druce + Quigg LLP

(57) ABSTRACT

Aspects comprise systems implementing ray tracing functionality according to example architectures. In one example, rays are collected into collections against elements of an acceleration structure, which in some cases are associated with objects composing a scene being ray traced. Indications of detected ray intersections also can be collected in an output buffer, and in some examples, the output buffer can comprise a plurality of portions, each associated with a scene object, or a common portion of code to be executed during shading. Buffer contents can be accessed in a block read. An intersection shading resource can load data to be used in shading the intersections for the identified rays, and locally storing that data for use in shading those intersections.

34 Claims, 12 Drawing Sheets

U.S. PATENT DOCUMENTS

| | | | |
|---|---|---|---|
| 5,313,568 A | | 5/1994 | Wallace et al. |
| 5,933,146 A | * | 8/1999 | Wrigley .................. 345/420 |
| 5,973,699 A | * | 10/1999 | Kent ...................... 345/419 |
| 6,023,279 A | | 2/2000 | Sowizral et al. |
| 6,028,608 A | | 2/2000 | Jenkins |
| 6,111,582 A | | 8/2000 | Jenkins |
| 6,344,837 B1 | | 2/2002 | Gelsey |
| 6,489,955 B1 | | 12/2002 | Newhall, Jr. |
| 6,556,200 B1 | | 4/2003 | Pfister et al. |
| 6,559,843 B1 | | 5/2003 | Hsu |
| 6,731,304 B2 | | 5/2004 | Sowizral et al. |
| 7,009,608 B2 | | 3/2006 | Pharr et al. |
| 7,012,604 B1 | | 3/2006 | Christie et al. |
| 7,030,879 B1 | | 4/2006 | Pharr |
| 7,098,907 B2 | | 8/2006 | Houston et al. |
| 7,212,207 B2 | | 5/2007 | Green et al. |
| 7,250,948 B2 | | 7/2007 | Hayes et al. |
| 7,289,118 B2 | | 10/2007 | Schmittler et al. |
| 7,348,975 B2 | | 3/2008 | Reshetov et al. |
| 7,362,332 B2 | | 4/2008 | Gritz |
| 7,483,024 B2 | | 1/2009 | Maillot |
| 7,688,320 B2 | | 3/2010 | Shearer |
| 7,782,318 B2 | | 8/2010 | Shearer |
| 7,830,379 B2 | | 11/2010 | Peterson et al. |
| 2004/0249809 A1 | | 12/2004 | Ramani et al. |
| 2005/0264568 A1 | | 12/2005 | Keller |
| 2006/0098009 A1 | | 5/2006 | Zuniga |
| 2006/0139350 A1 | | 6/2006 | Reshetov et al. |
| 2007/0035545 A1 | | 2/2007 | Hempel et al. |
| 2007/0132754 A1 | | 6/2007 | Reshetov et al. |
| 2008/0024489 A1 | | 1/2008 | Shearer |
| 2008/0028154 A1 | | 1/2008 | Hoover et al. |
| 2008/0028403 A1 | | 1/2008 | Hoover et al. |
| 2008/0049017 A1 | | 2/2008 | Shearer |
| 2008/0074420 A1 | | 3/2008 | Kuesel et al. |
| 2008/0074421 A1 | | 3/2008 | Hayes |
| 2008/0088622 A1 | | 4/2008 | Shearer |
| 2008/0122841 A1 | | 5/2008 | Brown et al. |
| 2008/0122845 A1 | | 5/2008 | Brown et al. |
| 2008/0150944 A1 | | 6/2008 | Reshetov et al. |
| 2008/0211804 A1 | | 9/2008 | Hempel et al. |
| 2009/0102844 A1 | | 4/2009 | Deparis |
| 2009/0128562 A1 | | 5/2009 | McCombe et al. |
| 2009/0183167 A1 | | 7/2009 | Kupferschmidt et al. |
| 2009/0189898 A1 | | 7/2009 | Dammertz et al. |
| 2010/0194751 A1 | | 8/2010 | Wald et al. |

FOREIGN PATENT DOCUMENTS

| | | | |
|---|---|---|---|
| WO | WO 2008/037599 A1 | | 4/2008 |

OTHER PUBLICATIONS

Stefan Heinrich and Alexander Keller, "Quasi-Monte Carlo Methods in Computer Graphics, Part II: The Radiance Equation," Technical Report 243/94, Fachbereich Informatik, AG Numerische Algorithmen, Universit at Kaiserslautern, 1994.

F James, "Monte Carlo theory and practice," Reports on Progress in Physics, vol. 43, 1980, pp. 1145-1189, The Institute of Physics, Great Britain.

Stefan Heinrich and Alexander Keller, "Quasi-Monte Carlo Methods in Computer Graphics, Part I: The QMC Buffer," Technical Report 242/94, Fachbereich Informatik, AG Numerische Algorithmen, Universit at Kaiserslautern, 1994.

Russel E. Caflisch and Bradley Moskowitz, "Modified Monte Carlo Methods Using Quasi-Random Sequences," Lecture Notes in Statistics 106, Dec. 1994, Mathematics Department, UCLA, Los Angeles, CA.

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [Retrieved on Oct. 26, 2009].

P. A. Navrátil, D. S. Fussell and C. Lin, "Dynamic Ray Scheduling for Improved System Performance," The University of Texas at Austin, Technical Report TR-07-19, Apr. 12, 2007.

P. A. Navrátil, D. S. Fussell, C. Lin and W. R. Mark, "Dynamic Ray Scheduling to Improve Ray Coherene and Bandwidth Utilization," IEEE Symposium on Interactive Ray Tracing, 2007, Sep. 10-12, 2007, pp. 95-104.

Carsten Benthin, PhD thesis: "Realtime Ray Tracing on Current CPU Architectures," Saarland University, Saarbrücken, Germany, Jan. 2006. (Available at graphics.cs.uni-sb.de/~benthin/phd.pdf, last visited on Jan. 7, 2008.).

I. Wald, P. Slusallek, C. Benthin and M. Wagner, "Interactive Rendering with Coherent Ray Tracing," Computer Graphics Forum, Proceedings of EUROGRAPHICS 2001, vol. 20, No. 3, 2001.

James Bigler, Abe Stephens and Steven G. Parker, "Design for Parallel Interactive Ray Tracing Systems," Proceedings of the IEEE Symposium on Interactive Ray Tracing, 2006, pp. 187-196.

M. Pharr, C. Kolb, R. Gershbein and P. Hanrahan, "Rendering Complex Scenes with Memory-Coherent Ray Tracing," in Computer Graphics, vol. 31, pp. 101-108, Aug. 1997, ACM Siggraph 1997 Conference Proceedings.

Eric Haines, Ray Tracing News: "Light Makes Right," vol. 12, No. 2. Dec. 21, 1999. Retrieved from the Internet: http://tog.acm.org/resources/RTNews/html/rtnv12n2.html#art3 [retrieved on Mar. 10, 2008].

Sven Woop, Jörg Schmittler and Philipp Slusallek, "RPU: A Programmable Ray Processing Unit for Realtime Ray Tracing," ACM Transactions on Graphics (TOG), vol. 24, Issue 3, (Jul. 2005), Proceedings of ACM SIGGRAPH 2005, session: Hardware rendering, pp. 434-444, 2005.

Jörg Schmittler, Ingo Wald, and Philipp Slusallek, "SaarCOR—A Hardware Architecture for Ray Tracing," Proceedings of the ACM SIGGRAPH/EUROGRAPHICS conference on Graphics hardware, Saarbrucken, Germany, Session: Ray tracing vs. scan conversion, pp. 27-36, 2002.

I. Wald, P. Slusallek and C. Benthin, "Interactive Distriuted Ray Tracing of Highly Complex Models," Rendering Techniques 2001—Proceedings of the 12th EUROGRAPHICS Workshop on Rendering, pp. 274-285, London, England, Jun. 2001.

J.G. Cleary, B.M. Wyvill, G.M. Birtwistle and R. Vatti, "Multiprocessor Ray Tracing," Computer Graphics Forum, vol. 5, issue 1, pp. 3-12, 1986.

N. Thrane and L.O. Simonsen, "A Comparison of Acceleration Structures for GPU Assisted Ray Tracing", Masters thesis, University of Aarhus, Denmark, Aug. 1, 2005. (Available at http://www.larsole.com/files/GPU_BVHthesis.pdf, last visited on Jan. 7, 2008.).

G. Humphreys and C.S. Ananian, "TigerSHARK: A Hardware Accelerated Ray-Tracing Engine," Technical report, Princeton University, Princeton, NJ, May 14, 1996. (Available at citeseer.ist.psu.edu/article/humphreys96tigershark.html, last visited on Jan. 7, 2008.).

W.R. Mark and D. Fussell, "Real-Time Rendering Systems in 2010," The University of Texas at Austin, Department of Computer Sciences, Technical Report # TR-05-18, May 2, 2005. (Available at http.//www-csl.csres.utexas.edu/users/billmark/papers/rendering2010-TR/TR05-18-Rendering2010.pdf, last visited Jan. 7, 2008.).

H. Friedrich, J. Günther, A. Dietrich, M. Scherbaum, H-P Seidel and P. Slusallek, "Exploring the Use of Ray Tracing for Games," Proceedings of the 2006 ACM SIGGRAPH symposium on Videogames, Boston, MA, pp. 41-50, 2006.

Geoff Wyvill, "Practical Ray Tracing," Computer Graphics International 1995, Tutorial notes.

E. Månsson, J. Munkberg and T. Akenine-Möller, "Deep Coherent Ray Tracing," RT 07—Symposium on Interactive Ray Tracing 2007, Sep. 10-12, 2007, pp. 79-85.

I. Wald and P. Slusallek, "State of the Art in Interactive Ray Tracing," In Stale of the Art Reports, EUROGRAPHICS 2001, pp. 21-42, 2001.

M.L. Anido, N. Tabrizi, H. Du, M. Sanchez-Elez M and N. Bagherzadeh, "Interactive Ray Tracing Using a SIMD Reconfigurable Architecture," Proceedings of the 14th Symposium on Computer Architecture and High Performance Computing, 2002, pp. 20-28.

A.J. van der Ploeg, "Interactive Ray Tracing, the replacement of rasterization?" B,Sc. thesis, VU University Amsterdam, The Netherlands, Dec. 2006.

H. Du, M. Sanchez-Elez, N. Tabrizi, N. Bagherzadeh, M.L. Anido and M. Fernandez, "Interactive Ray Tracing on Reconfigurabie SIMD MorphoSys," Proceedings of the Design, Automation and Test in Europe Conference and Exhibition, 2003, Asia and South Pacific Jan. 21-24, 2003, pp. 471-476.

M. Sanchez-Elez, H. Du, N. Tabrizi, Y. Long, N. Bagherzadeh and M. Fernandez, "Algorithm Optimizations and Mapping Scheme for Interactive Ray Tracing on a Reconfigurable Architecture," Computers & Graphics 27(5), 2003, pp. 701-713.

Jeffrey A. Mahovsky, "Ray-Tracing with Reduced-Precision Bounding Volume Hierarchies," PhD thesis, University of Calgary, Alberta, Canada, 2005.

J. Fender and J. Rose, "A High-Speed Ray Tracing Engine Built on a Field-Programmable System," Proceedings of the 2003 IEEE International Conference on Field-Programmable Technology (FPT), Dec. 15-17, 2003, pp. 188-195.

E. Groller and W. Purgathofer, "Coherence in Computer Graphics," Institute for Computer Graphics, Technical University Vienna, Vienna, Austria. In Transactions on Information and Communications Technologies, vol. 5, 1993 WIT Press.

K. R. Subramanian. A Search Structure based on K-d Trees for Efficient Ray Tracing. PhD thesis, The University of Texas at Austin, Dec. 1990.

Eric Larsen, Stefan Gottschalk, Ming C. Lin, and Dinesh Manocha, "Fast Distance Queries with Rectangular Swept Sphere Volumes," Proceedings of IEEE International Conference on Robotics and Automation, San Francisco, CA, 2000, vol. 4, pp. 3719-3726.

James T. Klosowski, Martin Held, Joseph S.B. Mitchell, Henry Sowizral and Karel Zikan, "Efficient Collision Detection Using Bounding Volume Hierarchies of K-DOPs," IEEE Transactions on Visualization and Computer Graphics, Jan. 1998, vol. 4, issue 1, pp. 21-36.

Hank Weghorst, Gary Hooper and Donald P. Greenberg, "Improved Computational Methods for Ray Tracing," ACM Transactions on Graphics (TOG), Jan. 1984, vol. 3, issue 1, pp. 52-69.

Frederic Cazals, George Drettakis and Claude Puech, "Filtering, Clustering and Hierarchy Construction: a New Solution for Ray-Tracing Complex Scenes," Computer Graphics Forum (Eurographics '95) 14, 3.

Christian Lauterbach, Sung-Eui Yoon, David Tuft and Dinesh Manocha, "RT-DEFORM: Interactive Ray Tracing of Dynamic Scenes using BVHs," In Proceedings of the 2006 IEEE Symposium on Interactive Ray Tracing, Salt Lake City, UT, Sep. 18-20, 2006.

Wilfrid Lefer "An Efficient Parallel Ray Tracing Scheme for Distributed Memory Parallel Computers," Oct. 25, 1993, Parallel Rendering Symposium, 1993 San Jose, CA, USA Oct. 25-26, 1993, New York, NY, USA, IEEE, pp. 77-80.

A. Augusto de Sousa and F. Nunes Ferreira, "A Scalable Implementation of an Interactive Increasing Realism Ray-Tracing Algorithm," Vector and Parallel Processing—VECPAR '96. Second International Conference on Vector and Parallel Processing—Systems and Applications. Selected Papers Springer-Verlag Berlin, Germany, 1997, pp. 458-469.

Eric Haines, Ray Tracing News: "Light Makes Right," vol. 3, No. 1, Jan. 2, 1990. Retrieved from the Internet: URL:http://tog.acm.org/resources/RTNews/html/rtnv3n1.html [retrieved on Jul. 28, 2009].

Andreas Dietrich, Ingo Wald, Carsten Benthin and Philipp Slusallek, "The OpenRT Application Programming Interface—Towards a Common API for Interactive Ray Tracing—" Proceedings of the 2003 OpenSG Symposium (Darmstadt, Germany), Eurographics Association, 2003, pp. 23-31.

Andreas Dietrich, Ingo Wald, Carsten Benthin and Philipp Slusallek, "The OpenRT Application Programming Interface—Towards a Common API for Interactive Ray Tracing—" OpenSG 2003. Darmstadt, Germany (Available online at http://graphics.cs.uni-sb.de/fileadmin/cguds/papers/2003/opensg03/TheOpenRTAPI_OpenSG2003.ppt, last visited Sep. 21, 2009).

J. Hanika and A. Keller, "Towards Hardware Ray Tracing using Fixed Point Arithmetic," IEEE/EG Symposium on Interactive Ray Tracing, 2007, Sep. 10-12, 2007, Ulm, Germany, pp. 119-128.

John Amanatides, "Ray Tracing with Cones," ACM SIGGRAPH Computer Graphics 18(3), Jul. 1984, pp. 129-135.

James Arvo and David Kirk, "Fast Ray Tracing by Ray Classification," ACM SIGGRAPH Computer Graphics 21(4), Jul. 1987, pp. 55-64.

Paul S. Heckbert and Pat Hanrahan, "Beam Tracing Polygonal Objects," ACM SIGGRAPH Computer Graphics 18(3), Jul. 1984, pp. 119-127.

Kenneth I. Joy and Murthy N. Bhetanabhotla, "Ray Tracing Parametric Surface Patches Utilizing Numerical Techniques and Ray Coherence," ACM SIGGRAPH Computer Graphics 20(4), Aug. 1986, pp. 279-285.

Masataka Ohta and Mamoru Maekawa, "Ray-bound tracing for perfect and efficient anti-aliasing," The Visual Computer: International Journal of Computer Graphics. vol. 6, issue 3, Springer Berlin / Heidelberg, May 1990, pp. 125-133.

M. Shinya, T. Takahashi and S. Naito, "Principles and Applications of Pencil Tracing," ACM SIGGRAPH Computer Graphics 21(4), Jul. 1987, pp. 45-54.

I. Wald, C. Gribble, S. Boulos and A. Kensler, "SIMD Ray Stream Tracing—SIMD Ray Traversal with Generalized Ray Packets and On-the-fly Re-Ordering," SCI Institue Technical Report No. UUSCI-2007-012, 2007.

David R. Chapman, "High Definition Interactive Animated Ray Tracing on CELL Processor using Coherent Grid Traversal," Class final project paper, CMSC 635: Advanced Computer Graphics, Computer Science and Electrical Engineering, University of Maryland, Baltimore County, Baltimore, MD (Available online at http://www.csee.umbc.edu/~olano/635s07/dchapm2.pdf, last visited Oct. 30, 2009).

C. Benthin, I. Wald, M. Scherbaum and H. Friedrich, "Ray Tracing on the Cell Processor," IEEE Symposium on Interactive Ray Tracing 2006, Sep. 18-20, 2006, pp. 15-23, Salt Lake City, UT.

Eric Lafortune, "Mathematical Models and Monte Carlo Algorithms for Physically Based Rendering," Ph. D. thesis, Department of Computer Science, Faculty of Engineering, Katholieke Universiteit Leuven, Feb. 1996.

William J. Morokoff and Russel E. Caflisch, "Quasi-random sequences and Their discrepancies," SIAM Journal on Scientific Computing, vol. 15, Issue 6, Nov. 1994, pp. 1251-1279, Philadelphia, PA.

Peter Shirley, Changyaw Wang and Kurt Zimmerman "Monte Carlo Techniques for Direct Lighting Calculations," ACM Transactions on Graphics, vol. 15, Issue 1, Jan. 1996, pp. 1-36, ACM, New York, New York.

William J. Morokoff and Russel E. Caflisch, "Quasi-Monte Integration," Journal of Computational Physics, vol. 122, Issue 2. Dec. 1995, pp. 218-230,1995, published by Academic Press Professional, Inc., San Diego, CA.

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

Susumu Horiguchi, Masayuki Katahira and Takeo Nakada, "Parallel processing of incremental ray tracing on a shared-memory multiprocessor," 1993, The Visual Computer, vol. 9, No. 7, pp. 371-380, Springer-Verlag.

* cited by examiner

FIG. 1
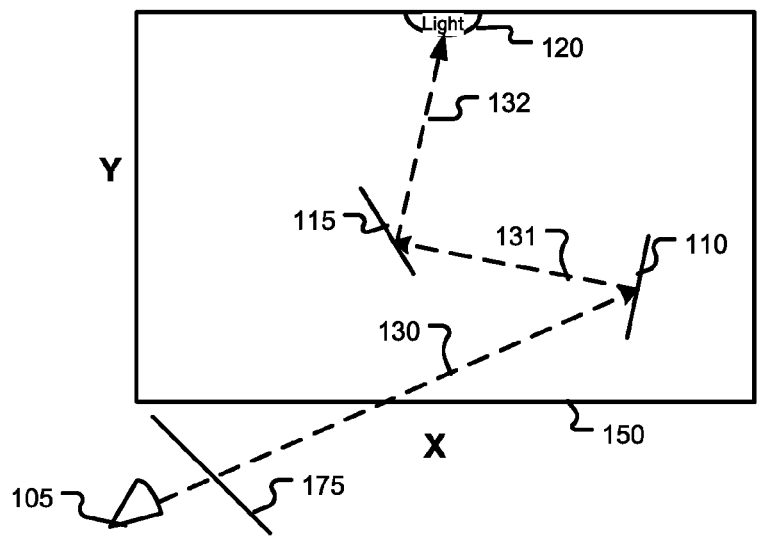
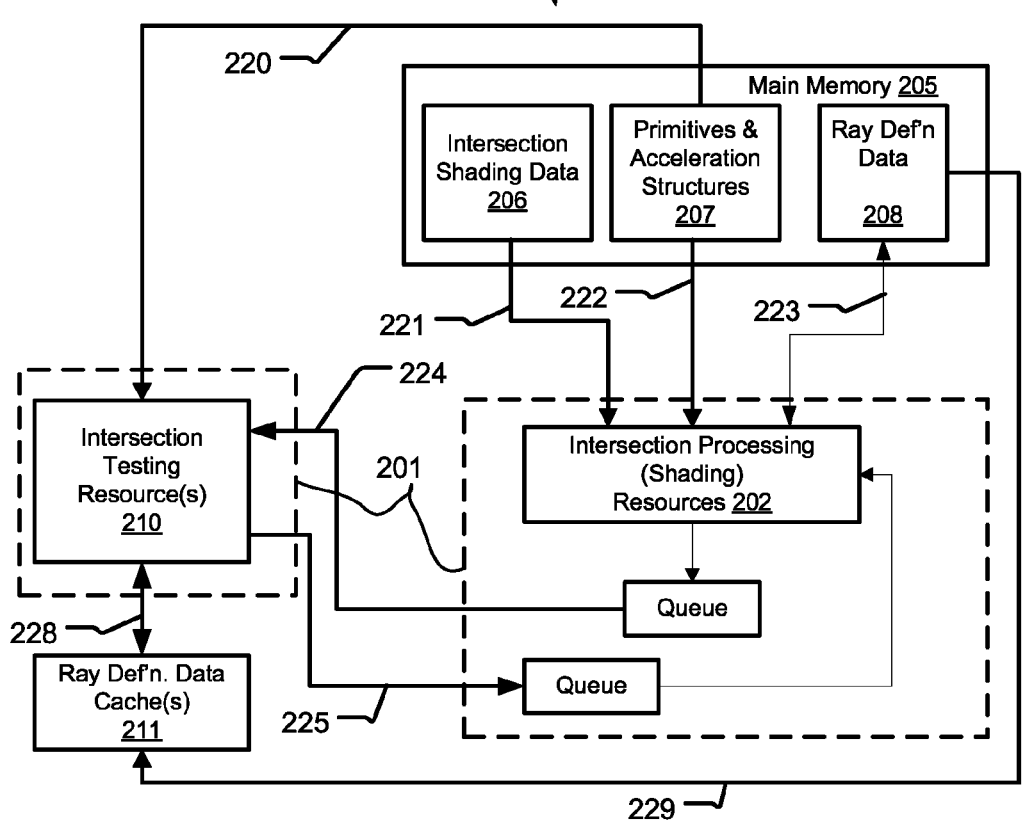
FIG. 2

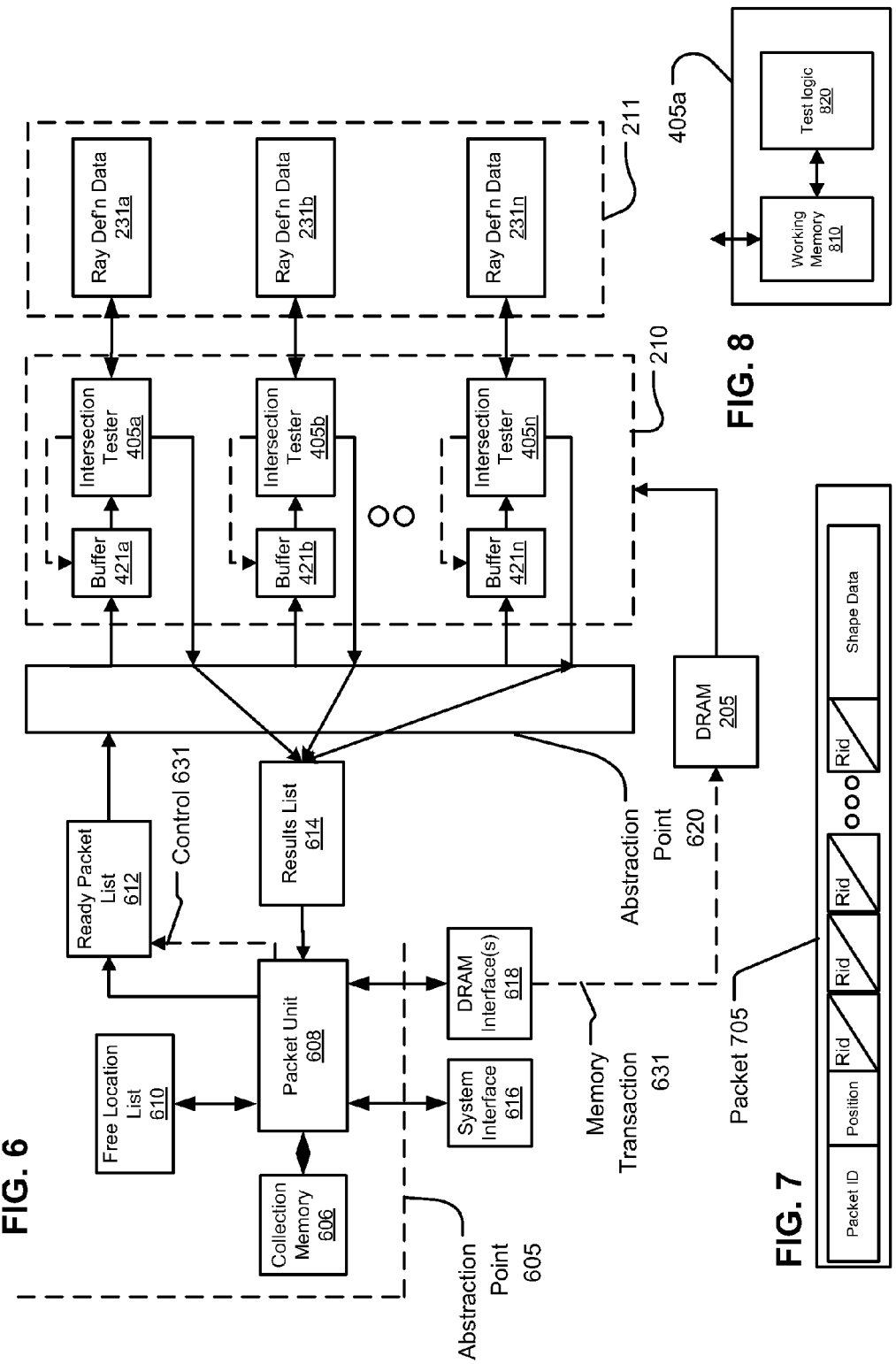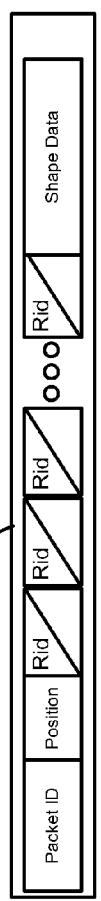

RAY TRACING SYSTEM ARCHITECTURES AND METHODS

CROSS-REFERENCE TO RELATED APPLICATIONS

This application is a continuation-in-part of U.S. patent application Ser. No. 12/408,478, filed on Mar. 20, 2009, which is a continuation-in-part of U.S. patent application Ser. No. 11/856,612, which was filed on Sep. 17, 2007, and claims priority from and incorporates U.S. provisional application No. 60/826,201, entitled "Ray Tracing Enhancements for Graphical Rendering", filed on Sep. 19, 2006; U.S. patent application Ser. No. 12/408,478 also claims priority from U.S. provisional application No. 61/038,731, entitled "Coupling Ray Storage and Compute for Memory-Efficient Ray Intersection Test Scaling", filed on Mar. 21, 2008, and from U.S. provisional application No. 61/095,890, entitled "Architectures for Parallelized Intersection Testing and Shading for Ray-Tracing Rendering", filed on Sep. 10, 2008; this application also claims priority from provisional app. No. 61/229,258, filed on Jul. 28, 2009 and from provisional app. No. 61/229,705, filed on Jul. 29, 2009, both entitled "Ray Tracing System Architectures and Methods"; and all applications referenced above are incorporated by reference in their entirety, for all purposes, herein.

BACKGROUND

1. Field

The following relates to rendering, using ray tracing, two-dimensional representations of three-dimensional scenes composed of shapes, and more particularly to systems, methods, and means for intersection testing of rays in 3-D scenes.

2. Related Art

Rendering photo-realistic 2-D images from 3-D scene descriptions with ray tracing is well-known in the computer graphics arts. Ray tracing usually involves obtaining a scene description composed of geometric shapes, which describe surfaces of structures in the scene, and can be called primitives. A common primitive shape is a triangle.

Virtual rays of light are traced into the scene from a view point ("a camera"); each ray is issued to travel through a respective pixel of the 2-D representation, on which that ray can have an effect. The rays are tested for intersection with scene primitives to identify a first intersected primitive for each ray, if any.

After identifying an intersection for a given ray, a shader associated with that primitive determines what happens next. For example, if the primitive is part of a mirror, then a reflection ray is issued to determine whether light is hitting the intersected point from a luminaire, or in more complicated situations, subsurface reflection, and scattering can be modeled, which may cause issuance of different rays to be intersected tested. By further example, if a surface of an object were rough, not smooth, then a shader for that object may issue rays to model a diffuse reflection on that surface. As such, finding an intersection between a ray and a primitive is a first step in determining whether and what kind of light energy may reach a pixel by virtue of a given ray, since what light is hitting that primitive still needs to be determined.

Thus, most conventional algorithms build a tree of rays in flight when ray tracing a scene, where the tree continues along each branch until it leaves the scene or hits a luminaire that does not issue new rays. Then, for those branches that hit light emissive objects, the branches are rolled up through the primitive intersections, determining along the way what effect each primitive intersection has on the light that hits it. Finally, a color and intensity of light for the originally issued camera ray can be determined and stored in the buffer.

Ray tracing can be naively parallelized by providing many processing resources that operate on different portions of pixels of a 2-D scene to be rendered. However, simply providing more computation capability does not necessarily allow a suitable scaling of ray tracing speed and efficiency. One reason for this is that such parallelization does not account for how data composing the scene, or an acceleration structure that increases tracing efficiency can be accessed in an efficient manner. A variety of improvements to ray tracing architectures remain to be provided.

SUMMARY

In one example, a system for use in ray-tracing-based 3-D scene rendering comprises an intersection testing resource, which comprises an access port to a memory resource storing definition data for a plurality of rays to be intersection tested in a 3-D scene. The intersection testing resource comprise one or more test cells for testing rays of the plurality for intersection with one or more of (1) primitives composing the 3-D scene and (2) elements of an acceleration structure bounding selections of the primitives. The system also comprises an output buffer coupled for receiving indications of detected intersections between rays and respective primitives. The output buffer can store the received indications pending a block output of at least some of the stored indications. The system also comprises a shading resource coupled for receiving the block output of stored indications from the output buffer and executing shader modules.

The output buffer can be implemented by a plurality of buffer portions. The intersection testing resource may comprises a sorter coupled to the output buffer for sorting the indications of detected intersections among the buffer portions. The sorter can sort based on commonality of shading code to be run for shading the detected intersections. Outputted indications may comprise identifiers for rays that are to cause execution of shader modules associated with a particular output buffer portion. Closest detected intersection information also can be outputted.

Commonality of shader code module or shader data can be determined based on identifiers associated with primitives, where in some examples, a portion of each primitive identifier identifies a scene object of which that primitive is a part. The scene object can be associated with one or more shader modules, and data related to that object, such as textures, uniforms, and so on.

Example methods that can be used in ray tracing comprise providing shapes comprising scene objects in a 3-D scene to be rendered. The objects can be composed of primitives. The shapes also comprise an acceleration structure comprising elements that bound selections of the primitives. The method comprises defining a plurality of rays to be processed. The processing for the rays comprises identifying a respective closest intersection, if any, with the primitives and shading such an intersection by executing one or more code modules. The processing described above is performed for each of the rays. The processing is scheduled by making collections of the rays based on outputs produced during processing. Each ray is concurrently collectible into a plurality of the collections. Each collection is associated with at least one of the shapes. The method can effect scheduling of the processing by selecting rays for performance of further processing by selecting one or more collections to which those rays belong.

Such example methods may comprise identifying a respective closest intersection by traversal of an acceleration structure that sub-divides a 3-D scene, resulting in possible identification of subsets of primitives composing the 3-D scene, against which the rays are to be tested for intersection. The processing can be deferred for individual rays until determining that a ray collection is ready, and a subsequent iteration of processing for rays of that ready collection can then be performed.

Other examples include components that can be used in a ray tracing system. An example of such a component comprises an input for receiving identifiers of rays that have been found to intersect a primitive composing a 3-D scene being ray traced, and a plurality of buffers. The component comprises a sorter coupled to the plurality of buffers, which is operable to disperse the ray identifiers among the plurality of buffers, the dispersal provides for grouping the identifiers for rays that are expected to require one or more of common shading code and common shading data for shading their respective intersections. The component also comprises an output for sending contents of a selected buffer to a computation resource to be configured for shading intersections for the rays identified by identifiers stored in the selected buffer.

Further aspects can include methods of providing systems that can be used for ray tracing, such methods can comprise providing an intersection testing resource operable for concurrent intersection testing of a plurality of rays in a 3-D scene, resulting in identification of detected valid intersections for at least some of the plurality of rays. Such methods also can comprise providing an intersection shading resource for configuration to run shading code for shading detected valid ray intersections, and providing for communication between the intersection testing resource and the shading resource. The communication is implemented by outputting one or more groupings of information for the detected intersections. The groupings are determined based on an expectation that each intersection of each group will be shaded with one or more of common shading code and common shading data.

In systems and methods according to disclosed examples, shading and intersection testing resources can comprise a number of threads for execution on processing resources, as well as more fixed function or reconfigurable processing resources that perform the shading and intersection testing described.

Methods according to disclosed examples can be implemented by software stored on tangible computer readable media, which are articles of manufacture. A variety of other examples of systems, methods, and overall architectures for such systems and methods are disclosed.

BRIEF DESCRIPTION OF THE DRAWINGS

FIG. 1 depicts a simplistic toy scene with a camera emitting rays that are intersection tested, and such intersections cause shaders to execute, emitting further rays for intersection testing;

FIG. 2 depicts an example system architecture in which an intersection testing resource, a computation resource for executing shaders, and examples of their interconnection are illustrated;

FIG. 6 depicts further details of an example architecture for providing ray tracing functionality in a system;

FIG. 7 depicts an example organization of a packet that can be sent from a packet unit according to FIG. 6, and used by an arbiter to trigger intersection testing of rays that the packet identifies;

FIG. 8 depicts aspects of a tester that can be used in ray intersection testing, and which can be abstracted from its control by the arbiter of FIG. 6;

DETAILED DESCRIPTION

Figure 3:
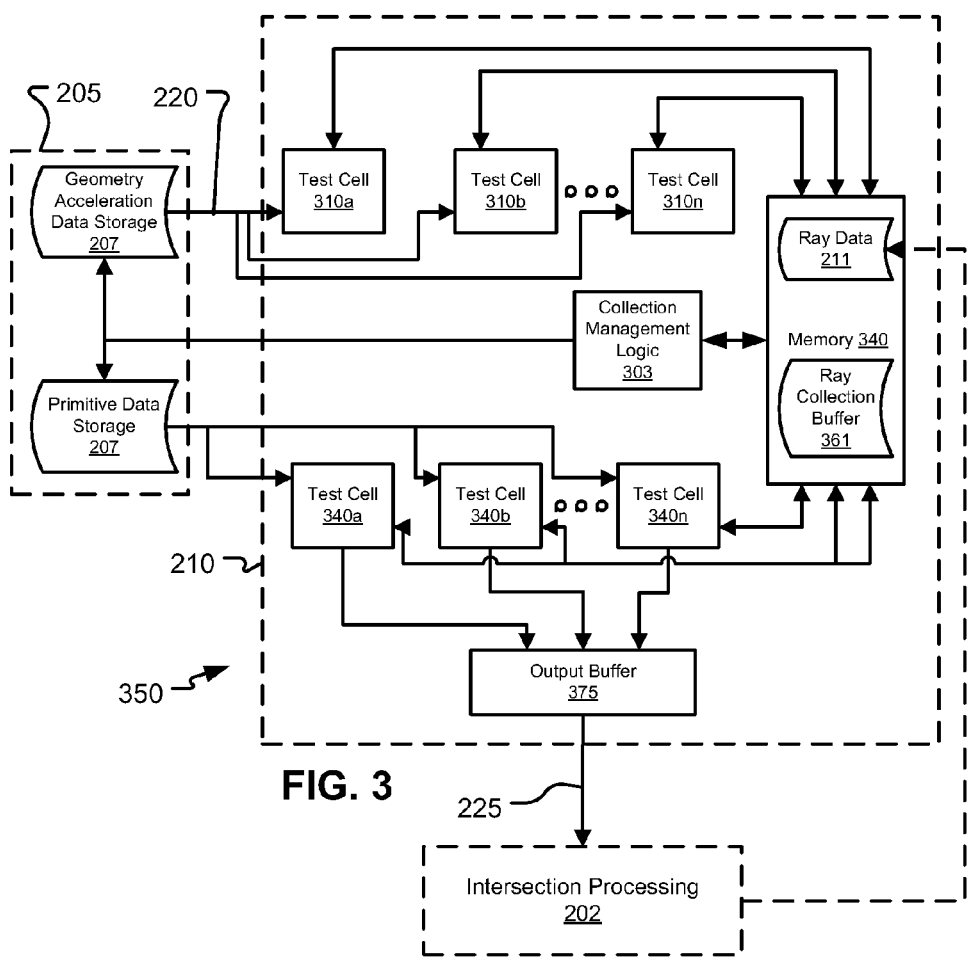
FIG. 3 depicts an example intersection testing architecture and control logic for managing usage of the components thereof.

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

For clarity in description, data for a certain type of object, e.g., a primitive (e.g., coordinates for three vertices of a triangle) usually is described simply as the object itself, rather than referring to the data for the object. For example, when referring to "a ray", it is to be understood that data representative of that ray is referenced, as well as the concept of the ray in the scene.

FIG. 1 illustrates a simplified scene setup, in which a 2-D plane 175 is disposed between a camera 105 and a scene 150, comprising objects 110, 115 and a light 120. A camera ray 130 is emitted from camera 105 (such using program code descriptive of behaviors of the camera). It is determined through intersection testing that ray 130 intersects object 110. A ray 131 is emitted by a shader (e.g., program code and data describing behavior for an object or surface) associated with object 110. For example, object 110 may have a mirrored surface, and as such the shader for it would generate ray 131 to test reflection at an angle that ray 130 was incident on object 110. It then is determined that ray 131 hits object 115.

For simplicity, a shader associated with object 115 is shown to have similar behavior to that of the shader for object 110, emitting a ray 132 to test whether light is incident on object 115 at an angle that could have traveled on the path of ray 131. Ray 132 is determined to intersect light 120.

The example of FIG. 1 was necessarily grossly simplified. Many factors adding computational cost to a more realistic ray tracing scene include that the resolution of the 2-D representation to be rendered can be high, such as a full HD resolution of 1920×1080 pixels (over 2 million pixels). Each pixel of the scene can have many rays emitted from the camera that are associated with it. Thus, rendering such a scene can involve initially testing many millions of camera rays alone, followed by much higher numbers of rays that are emitted by shaders identified based on object intersections with camera rays, and in turn rays subsequently emitted by shaders.

Shaders can involve substantial computation and emission of further rays that test various conditions. For example, shaders can perform diffuse lighting tests, such as Monte Carlo diffuse lighting, which involves emission of a number of rays to test ambient lighting conditions. Shaders may emit rays to test whether an intersection point is shadowed by another object for known light sources in the scene. Shaders also can model complex materials characteristics, such as subsurface scattering for skin, reflection, refraction, and so on. Each of these functions can involve emission of rays that need to be intersection tested in the scene. Thus, rendering a full HD high resolution 2-D representation of a complex scene can involve intersection testing of hundreds of millions or more rays.

Thus, for purposes herein, this example shows that a ray is tested for intersection in a scene. If it is found to intersect an object (e.g., a primitive), then a shader associated with that object can be identified and executed. That shader can in turn emit more rays to be intersection tested. The number and type of rays that shader emits typically depends both on characteristics of the intersecting ray and also on the effects that the shader is implementing.

With so many rays needing intersection testing, not all rays can be intersection tested concurrently. Also, considering the rendering of a scene progressing from start to finish, at any given time, not all rays that need to be traced to complete the rendering have been defined, since scene rendering itself determines what rays will be tested.

FIG. 2 illustrates an example system 200 for use in rendering a scene with ray tracing techniques. System 200 comprises a main memory 205, in which is stored data 206 for intersection shading (e.g., shader code, textures, procedural geometry, and so on), primitives and acceleration shape elements (e.g., triangles, triangle strips, vertexes, bounding spheres, axis aligned bounding box or k-d tree definitions, and so on), and a master copy of data 208 defining the rays currently being tested for intersection in the scene. The main memory 205 communicates with an intersection processing resource 202, in which shaders for identified ray/primitive intersections can be run. The communication between memory 205 and intersection processing resource 202 is shown to include link 221 for providing intersection shading data 206 from memory 205, and link 222 for providing primitive data from memory 205.

The intersection processing resource 202 operates to shade intersections identified by an intersection testing resource 210. Intersection testing resource 210 is directed to test rays by a controller 203. Controller 203 provides indications of rays to be tested to intersection testing resource 210 via a link 225; preferably controller 203 indicates rays to be tested by providing an identifier, which can be related to a memory location storing data defining that ray resident in cache 211. In that preferred situation, definition data for the rays to be tested is obtained/received via link 228 from ray definition cache 211. Intermediate testing results of a current closest detected primitive intersection can be stored with ray definition data in cache 211 (i.e., in some implementations, rays can intersect primitives, but if the rays are not tested in an order that the ray traverses the scene, then a farther intersection can be detected prior to a real, closest intersection, which is generally the only intersection of interest).

Closest possible detected intersections (if any) are indicated via a link 224 to controller 203 (e.g., if a ray did not intersect any scene object that that ray may or may not be indicated through link 224). Intersection testing resource 210 receives primitive and acceleration shape data from memory 205 through link 220.

Controller 203 arranges for processing of these possible closest indicated intersections in intersection processing resources 202. Controller 203 receives data defining rays to be intersection tested that have been created by the shaders executing on resources 202. In FIG. 2, link 226 is depicted for receiving such new ray data, while link 227 is depicted for providing information to instantiate shading of a particular intersection that was provided from link 224. Link 227 can comprise providing, or fetching code and data defining a shader, or otherwise directing intersection processing resources to perform such fetching from memory 205.

Controller 203 also manages the master copy of ray definition data 208 stored in memory 205, and can store data defining new rays in memory 205 via link 223. Data stored in memory 205 defining rays that have completed intersection testing are replaced by data defining new rays instantiated by the shaders.

The intersection testing resources 210 and the intersection processing resources 202 can be implemented on a processing platform 201 and can comprise threads of processing on a multithreaded processor, or threads executing on separate cores of a multiple core processor, or physically separate processors, each potentially with multiple cores. Each thread can execute instructions from computer executable code obtained from memory 205 or from another source. Similarly, memory 205 may be implemented as dynamic RAM accessible through a memory controller (not separately depicted) by processor 201. Cache 211 may be implemented in various levels, such as a private or semi-private L1 cache owned by one or more cores in a multiple core processor, L2 caches and L3 that may be shared among cores and/or among processors. Preferably, ray definition data stored in cache 211 is protected from being overwritten by normal cache management algorithms, such as Least Recently Used, and the like. Instead, it is preferred that controller 203 manage the ray definition data stored in cache 211, as a subset of the ray definition data master 208. Such ray definition data in cache 211 can be updated from master 208 via link 229.

The links 220-229 illustrated may be implemented based on the implementation of the cache 211, memory 205, and the intersection testing 210 and processing 210 resources.

Generally, intersection testing resource 210 performs more fixed-function types of computation, in that it tests rays for intersection against shapes, usually either a primitive shape or an acceleration shape element, which bounds a selection of primitives defining the scene. By contrast, the types of computation to be performed during shading (on the intersection processing resource 202) is more general, in that shaders can perform a variety of computation, access, manipulate and create various data, and so on. Therefore, in some circumstances, intersection testing resources 210 can be implemented beneficially with more fixed-function processing, while resources 202 can often be implemented beneficially on a more general purpose computing platform. Therefore, in some circumstances, intersection testing resources 210 can be provided as an acceleration function, add-in card, co-processor, or the like that either is fixed-function or can be programmed with the expectation that the programming will not change often during the rendering of a scene.

Implementations according to this disclosure need not have all characteristics shown in example system 200. For example, in system 200, rays are indicated for intersection testing by providing ray identifiers, separate from data defining the rays to intersection testing resource 210, which is optional. By further example, various links where illustrated, but depending on the implementation, not all such links may be necessary or desired. Instead, FIG. 2 depicts a system wherein computation resources can be provided for intersection testing, and they therefore produce indications of detected intersections. These intersection testing resources can operate concurrently with computation resources that are executing shaders for detected intersections. The shaders emit new rays for intersection testing, which are taken up for testing by the intersection testing resources.

FIG. 3 includes a block diagram of an example of an intersection testing resource 210 that includes a plurality of test cells 310a-310n and 340a-340n. Acceleration structure elements are illustrated as being sourced from storage 207 (elements of an acceleration structure can be defined by definition data contained in a memory that also contains data defining primitives of the scene.

ITU 303 also comprises collection management logic 303 and collection buffer 361. Collection buffer 361 and ray data 211 can be stored in a memory 340 that can receive ray data from memory 139 (for example). Collection buffer 361 maintains ray references associated with GAD elements. Collection management 303 maintains those collections based on intersection information from test cells. Collection management 303 also can initiate the fetching of primitives and GAD elements from memory 207 for testing ray collections.

ITU 303 returns indications of identified intersections, which can be buffered in output buffer 375 for ultimate provision via results interface 225 to intersection processing 202. Indications may comprise information sufficient to identify a ray and a shape, such as a primitive, which the ray was determined, within a given degree of precision, to intersect. The degree of precision can include that a given bounding element bounding one or more primitives was found to be intersected by one or more rays, but each primitive has not yet been finally intersection tested with such rays.

ITU 303 can be viewed as a function or a utility that can be called through a control process or driver that provides ITU 303 with rays and geometric shapes against which the rays would be tested for intersection. For example, ITU 303 can be fed information through a driver, which can be considered in one aspect to be a process that interfaces ITU 303 with other rendering processes, such as shading, and initial ray generation functions. From the perspective of ITU 303, ITU 303 need not be aware of the origin of the information provided to it, as it can perform intersection testing using the rays, GAD, and primitives (or more generally, scene objects) provided to it, or obtained by it based on other information provided to it.

As described above, ITU 303 may control how, when, and what data is provided to it, such that ITU 303 is not passive, and may for example, fetch ray or geometry data, or acceleration data as required for intersection testing. For example, ITU 303 may be provided with a large number of rays for intersection testing, along with information sufficient to identify a scene in which the rays are to be tested. For example, ITU 303 may be provided more than ten thousand rays (10,000) rays for intersection testing at given time and as testing for those rays complete, new rays (generated by intersection processing 202) may be provided to keep the number of rays being processed in the ITU 303 at about the initial number, as described below. ITU 303 may thereafter control (in logic 303) temporary storage of the rays during processing (in ray collection buffer 361 (see FIG. 3)) and may also initiate fetching of primitives and elements of GAD as needed during the processing.

As described above, GAD elements and primitives are transient in ITU 303 compared to rays, as ray identifiers are maintained in buffer 361 and organized with respect to GAD elements, and data defining rays (ray data 211) is also maintained for use by test cells 310a-310n and 340a-340n. Each of buffer 361 and ray data 211 can be maintained in memory 340, which may be physically implemented in a variety of ways, such as one or more banks of SRAM caches.

As introduced above, logic 303 tracks status for ray collections stored in memory 340, and determines which collections are ready for processing. As shown in FIG. 3, logic 303 is communicatively coupled to memory 340, and can initiate delivery of rays for testing to each of the connected test cells.

In examples where a particular GAD element may bound both other GAD elements and primitives, ITU 303 can have datapath for providing both GAD elements and primitives to each test cell, as well as rays, so that logic 303 can arrange for testing rays of collections among the testing resources. In such examples, because of the typical difference in shape between GAD elements and primitives (spheres versus triangles, for example), an indication to switch test logic or load an intersection test algorithm optimized for the shape being tested may be provided from logic 303.

Logic 303 may directly or indirectly cause provision of information to test cells 310a-310n and test cells 340a-340n. In indirect situations, logic 303 can provide information to each test cell so that each test cell may initiate fetching of ray data for test from memory 340. Although logic 303 is illustrated separately from memory 340, for simplicity of description, logic 303 may be implemented within circuitry of memory 340, as management functionality performed by logic 303 largely relates to data stored in memory 340.

An ability to increase parallelization of access to memory 340 by intersection test resources is an advantage of some aspects described herein. As such, increasing a number of access ports to memory 340, preferably up to at least one per test cell is advantageous. Example organizations related to such parallelization are further described below.

Also, ITU 303 can operate asynchronously with respect to units that provide input data to it, or receive outputs from it. Here, "asynchronous" can include that the ITU may receive and begin intersection testing of additional rays while intersection testing continues for previously received rays. Also, "asynchronous" may include that rays do not need to complete intersection testing in an order that ITU 303 received them. Asynchronous also includes that intersection testing resources in ITU 303 are available for assignment or scheduling of intersection testing without regard to position of a ray within a 3-D scene, or a scheduling grid superimposed on the scene, or to test only rays having an intergenerational relationship, such as parent rays and children rays spawned from a small number of parent rays, or only rays of a specific generation—e.g., camera rays or secondary rays.

Output buffer 375 can receive indications of identified intersections of primitives and rays which possibly intersected the primitive. In an example, the indications include an identification for a primitive paired with an information sufficient to identify a ray that intersected the primitive. Identification information for a ray may include a reference, such as an index, which identifies a particular ray in a list of rays. For example, the list may be maintained by driver running on a host, and the list may be maintained in memory 205. Preferably, memory 205 also includes ray definition data for all the rays in memory 340. However, the ray identification information may also include information, such as the ray's origin and direction, sufficient to reconstruct the ray, if memory 205 does not contain such information.

Figure 4:
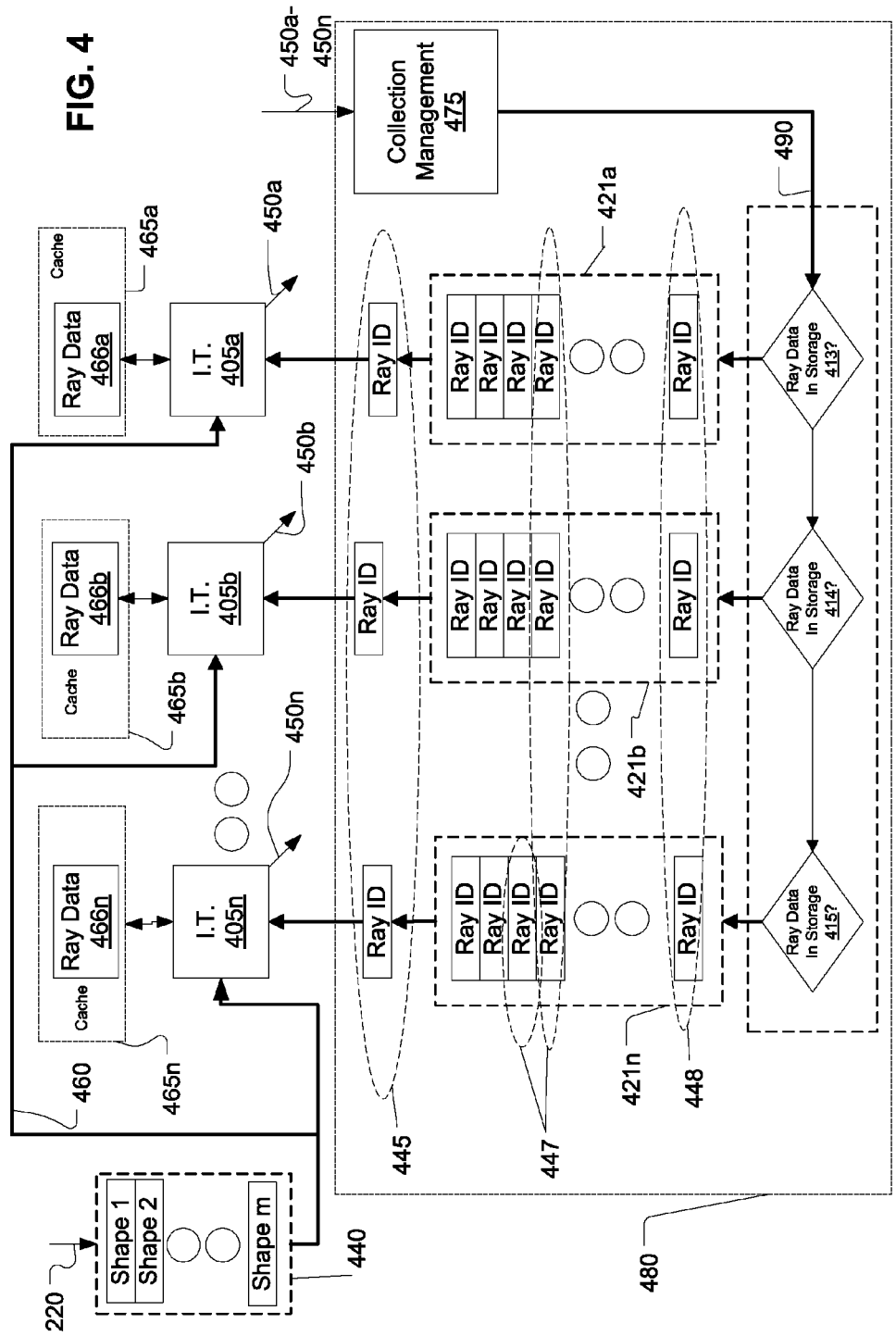
FIG. 4 depicts an example intersection testing architecture illustrating further details of how aspects of the above architectures can be implemented.

FIG. 4 depicts aspects of an example architecture to which systems can be designed and organized herein. The architecture depicted comprises a plurality of intersection testing resources ("intersection testers") 405a-405n each coupled with a respective cache 465a-465n, in which is stored respective ray definition data 466a-466n. Intersection testers 405a-405n receive scene objects to be tested for intersection through data lines 460, which can be fed through a memory access initiated by a collection manager 475. The shapes can be stored in a memory (e.g., a queue or a buffer) 440 to be made available to intersection testers 405a-405n.

Intersection testers 405a-405n thus have local access to ray definition data in respective memories, and are directed to obtain and use portions of such ray definition data by receiving ray identifiers from respective input buffers 421a-421n. Input buffers 421a-421n can be provided in or otherwise serviced by distribution logic 480 that implements decision points 413-415, in which a determination is made concerning whether a ray identifier provided from collection management 475 should be added to any of input buffers 421a-421n.

Each intersection tester 405a-405n produces results that can be provided to collection management 475 (as illustrated through results channels 450a-450n). In some examples, such results are processed by collection management when the results are for intersections between rays and elements of an acceleration structure (i.e., GAD elements), while if the results are for intersections between primitives and rays, then those results can be outputted from or forwarded by collection management 475. Collection management 475 maintains associations between the ray IDs and the respective GAD element bounding objects to be tested next (and for which data is provided in buffer 440 accessible to intersection testers 405a-405n.

In some examples, buffer 440 is filled by DMA transactions initiated by collection management 475 from a main memory (e.g., memory 205). For example, in a case of a hierarchical acceleration structure, buffer 440 can be made to store shapes that are children of a parent acceleration element, against which a collection of rays has been accumulated. Highest throughput is achieved when rays of a given collection are equally distributed among caches 466a-466n.

When multiple rays of a given collection are in one cache, then the other intersection testers can stall, or they can test rays from a next collection. Other aspects to note are that more than one ray ID for a given ray collection can be stored in any of queues 421a, 421b, 421c (shown by collection 447). In such cases, the ITR for that queue can test both rays, and output results for the second test (or however many subsequent tests) as they become available.

Where multiple rays for a given collection are tested in one of the intersection testers (e.g., intersection tester 405b), the remainder of results for that collection can wait for all results of a collection to be assembled, or the "straggler" result can be propagated as available, and while other tester is performed by the testers. In some implementations, a maximum number of out of order tests can be accommodated (or otherwise designed for) before collection testing synchronization is again required, as described below.

In sum, FIG. 4 illustrates a system organization allowing a packet of ray identifiers associated with one or more shapes to be distributed into queues for a plurality of testing resources, that each store a subset of ray data. Each test resource fetches ray data identified by each ray identifier against a shape loaded to the test resource. Preferably, the shapes can be streamed sequentially through all the test resources concurrently. The shapes can be identified as a sequence of children starting at an address in a main memory. Thus, FIG. 4 illustrates a system organization where a shape generally is tested concurrently against multiple rays.

Figure 5:
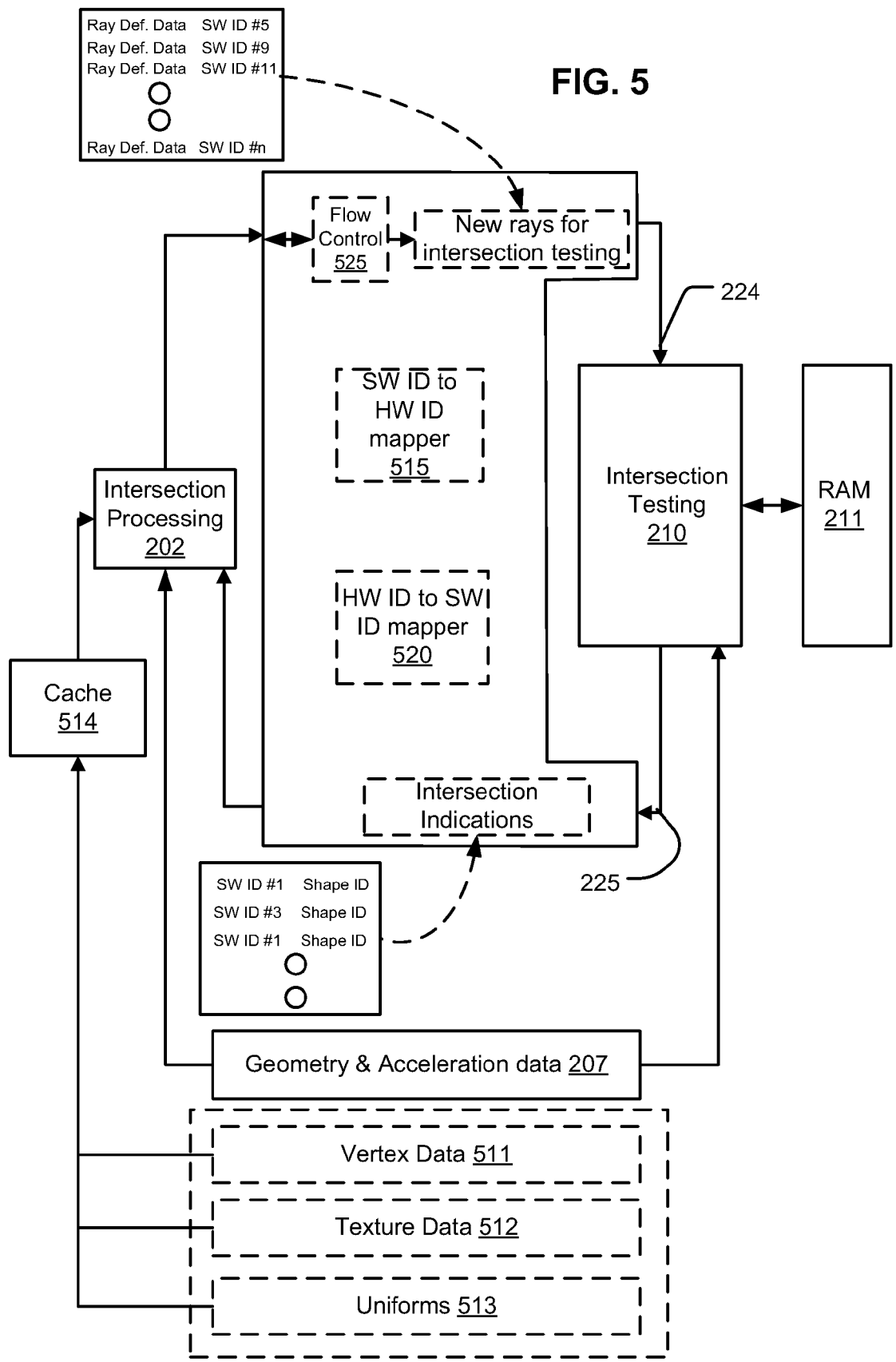
FIG. 5 depicts an example of how intersection processing (shading) and intersection testing (tracing) can be abstracted for ray tracing using ray identifiers meaningful within the scope of shading, and carried through ray tracing.

FIG. 5 depicts a alternate perspective on the architectural aspects depicted in FIGS. 2-4, in conjunction with other functionality. One high-level aspect of FIG. 5 is that intersection processing 202 may communicate with intersection testing 210 through an abstraction layer 501. In some instances, of abstraction layer 501, shaders executing for intersection processing can instantiate new rays to be intersection tested. Such new rays can be identified by identifiers meaningful within the context of the processing resources executing the shaders. For convenience, those identifiers are called "software identifiers" or "SW identifiers". These SW identifiers can be provided with definition data for rays to be tested to a SW to HW ID mapper 515, which produces a respective identifier for each of those rays that can be used to identify such rays during their intersection testing. The SW identifiers for the rays can be stored with the ray definition data, and when intersection results for a given ray are to be reported, the SW identifier for that ray can be reported, along with intersection information. The SW identifier can be identified for a particular HW identifier using a HW ID to SW ID mapper 520. In other examples the SW ID can be stored with ray definition data in RAM 211, and in other examples, the HW ID can be a subset of bits of the SW ID, or can be based on an algorithmic transformation of the SW ID.

However, in the context of systems according to an architecture like that of FIG. 4, it is preferred that the HW ray ID be selectable so that intersection testing resources can have flexibility in determining where to store ray definition data for a particular ray. This determination can be made to effect load balancing among separate memories storing ray definition data. Independent ray identifier strategies according to this example allow ray identifiers to be sized appropriately for different purposes. For example, a master ray memory may be maintained, and subsets of those rays may be actively intersection tested to completion in intersection testing 210. Thus, a number of rays in the master memory can be many times larger than a number of rays actively being tested, making identifiers to uniquely identify each ray in the master memory longer.

This ray identifier approach also provides an example architectural choice that accepts a larger total memory footprint for storing a given number of rays, in order to gain a benefit that total data movement to repetitively test a given ray for intersection is comparatively less.

Returning to FIG. 5, geometry and acceleration shape data 207 can be provided to both intersection processing (e.g. shading) and intersection testing (i.e., acceleration structure traversal and/or primitive intersection testing).

Results returned from intersection testing 210 to intersection processing 202 can comprise indications of detected intersections of rays against one or more of primitives and acceleration elements. In some implementations, rays can be collected or otherwise buffered at an output of intersection testing (e.g., output buffer 375). Buffering can be implemented in a variety of ways and can include that rays are sorted based on a variety of common attributes. As previously explained, rays can be collected into collections based on acceleration element, and it also was disclosed that acceleration elements can be made to bound a particular scene object. In some examples then, the collection of rays can be based on scene object. In some implementations, this collection strategy also can allow collection of rays to be executed against a common shader.

As shown with respect to output buffer 375, buffering of rays can be made to allow collections of rays to be executed against common shading code. Further, data elements to be used can be increased in locality by collecting rays in output buffer 375 so that vertex attribute data 511, texture data 512, and/or uniform data 513 can be made available for a given object to be used for shading a number of rays in a compact timeframe. In some respects, cache 514 can be loaded with these kinds of data after a number of rays are collected that intersect an object that uses such data. For example, a larger set of vertex attributes can be fetched and stored in cache 514 for an object intersected by a number of rays.

FIG. 6 depicts further aspects of an implementation of an intersection tester (e.g., intersection testing 210). As described with respect to FIG. 4, a number of intersection testers 405a-405n can be provided. Each of the testers can interface with a respective buffer 421a-421n. The buffers can contain ray identifiers and information about objects to be intersection tested with rays identified by the ray identifiers. The ray identifiers can be provided from a ready packet list 612 that is controlled (via control 631) from a packet unit 608. Ready packet list 612 can contain a list of ray identifiers to be tested for intersection against one or more shapes identified in the packet (either by reference or by included data). Abstraction point 620 receives such a packet from ready packet list 612 and splits the ray identifiers among the buffers 421a-421n based on which local memories 231a-231n contain definition data for each of the identified rays. In some implementations, abstraction point 620 can split the data based on correlating ray identifiers with memory address locations in local memories 231a-231n, such as by masking certain bits of each ray identifier in order to identify the intersection tester with ray definition data for that particular ray (of course, more than one local memory may store ray data for a given ray). Packets can reference elements of acceleration data or primitives to be intersection tested, and typically, rays are referenced first in packets to test against acceleration elements, and ultimately, primitives are identified to be tested.

Packet unit 608 communicates through another abstraction point 605, using system interface 616, to receive further rays to be packetized and intersection tested. Packet unit 608 also can interface with DRAM 618 in order to schedule memory transactions to deliver shape data to intersection testers based on references included with packets in ready list 612.

Packet unit 608 can use collection memory 606 in maintaining collections of ray identifiers against shapes in the acceleration structure, and in some cases, collection memory 606 can be subdivided into fixed size locations that can be used to store a given number of ray identifiers. Given that collection memory 606 can have a known or otherwise discoverable or configurable size, a known number of collections can be accommodated, and referenced. References to each such location can thus be maintained in a free location list 610. When results are read from results list 614, packet unit 608 processes those results into collections associated with each acceleration structure element intersected. Such processing can include retrieving an identifier for each of the acceleration elements from a return packet, or other information provided by one or more of intersection testers 405a-405n. In some implementations, intersection testers 405a-405n can pass a packet to collect ray intersection results for a given acceleration element amongst themselves, and in other examples, each intersection tester can aggregate test results for a number of acceleration elements and a ray, or for a ray and a number of acceleration elements.

Thus, intersection testing results get propagated through abstraction point 620 to results list 614, while rays of other collections identified in ready packet list 612 are distributed among buffers 421a-421n. Each intersection tester 405a-405n can be operable to read from its buffer when it is able to test another ray for intersection. In some examples, each entry of each buffer can identify a ray to be tested for intersection with an identified shape. As disclosed with respect to FIG. 4, data for the shape can be provided from a DRAM, and the provision of such data can be initiated by packet unit 608.

FIG. 7 depicts an example format of a packet 705 that can be stored in ready packet list 612, and includes components of a packet ID, a position, a plurality of ray identifiers and a shape identifier. The shape identifier preferably identifies a shape that was determined to be intersected by each ray of packet 705, where each identified ray is then to be tested against objects identified as related to the intersected shape (e.g., child nodes in a hierarchy of acceleration data).

When it is determined that packet 705 is to begin intersection testing, a separate packet can be formed for each object identified based on the identified shape, and each such packet can be provided to each of buffers 421a-421n. In other examples, data defining the objects to be tested can be provided to intersection testers 405a-405n, each of those objects can be identified as needing to be tested by the identified provided in the packet (e.g., a number of bits of the identifiers can remain the same, such that so long as a certain number of the bits match, such as the most significant bits, then a given object can be identified as a child of another object).

It was described with respect to FIG. 6 and elsewhere (e.g., FIG. 4) that packet unit 608, or another entity managing collection data can initiate provision of shape data to testers, when it is determined to test an identified group of rays with such shapes. FIG. 8 depicts an example composition of intersection testers 405a-405n in which a working memory 810 can operate to receive and store such shape data. Working memory 810 can cache such shape data for repeated tests with different rays, such as when a given packet identified two or more rays that were stored as ray definition data in memory for one tester (see discussion with respect to FIG. 4, above).

The storage of such shape data can be used in implementing further aspects relating to using ray identifiers for triggering ray testing amongst dispersed intersection testers, as described below.

FIG. 8 illustrates an example of a test cell 405a, which may contain a working memory 810 and test logic 820. Working memory 810 may be several registers, which contain information sufficient to test a line segment for intersection with a surface, or may be more complicated in other implementations. For example, working memory 810 may store instructions for configuring test logic 820 to test a particular shape received for intersection and may detect what shape was received based on the data received. Working memory 810 also may cache detected hits, where each test cell is configured for testing a series of rays against geometric shapes, or vice versa; then, the cached hits may be output as a group, as further described below. Working memory may also receive incoming shape data from storage, e.g., main memory (205), and store it for usage, such as in implementations according to the examples presented with respect to FIGS. 10A and 10B.

Figure 9:
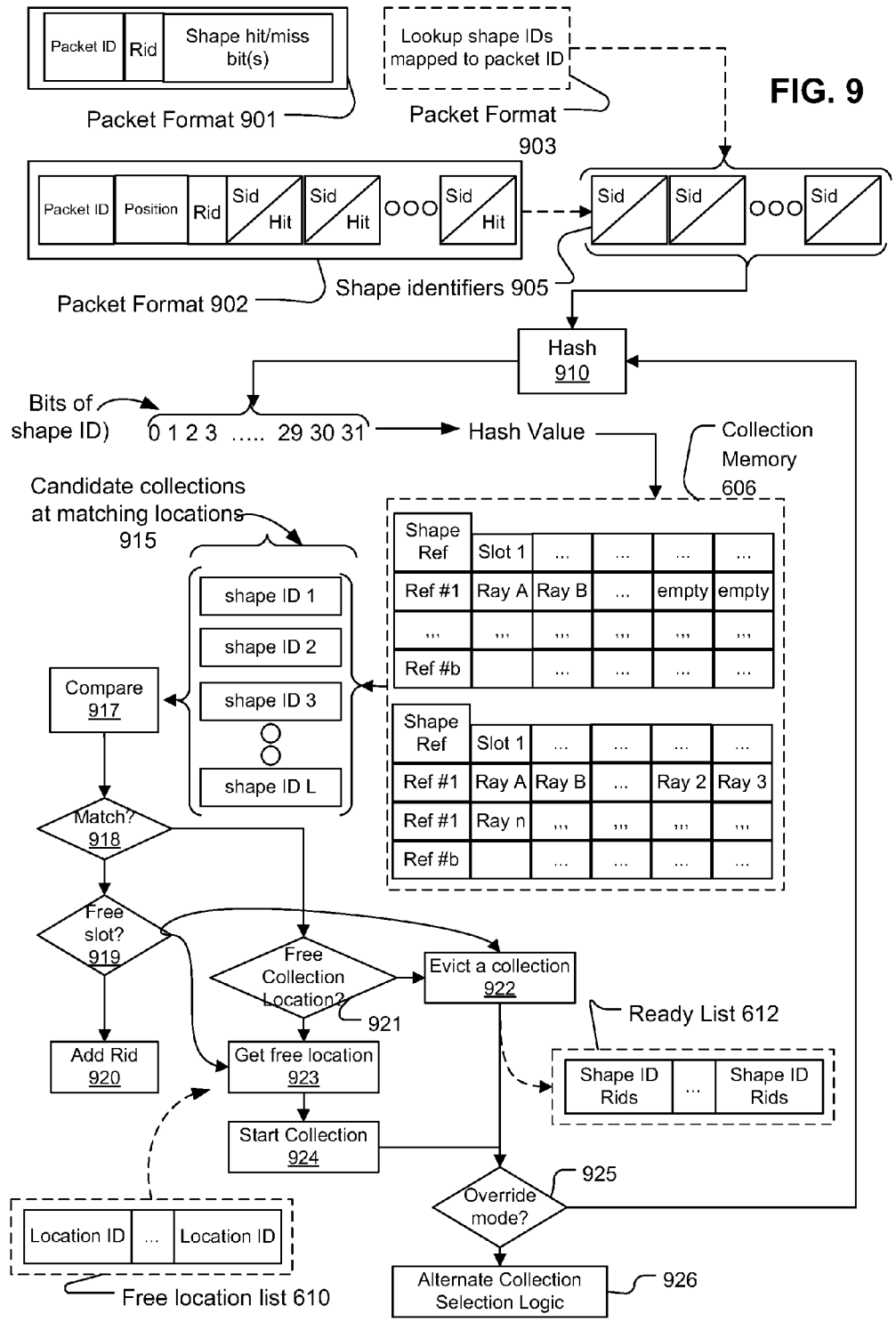
FIG. 9 depicts an example ray intersection testing results processing flow that can be implemented in the packet unit depicted in FIG. 6.

However, further explanation concerning how results can be processed is first described with respect to FIG. 9. FIG. 9 depicts a packet format 901 comprising a packet identifier, a ray identifier (Rid) and one or more shape hit bits. Packet format 902 depicts a packet ID, an acceleration tree position indicator (position), a ray identifier (rid) and a plurality of shape identifiers and respective indications of hit/miss information for each ray identifier.

If a packet format for presenting results that is in accordance with format 901, then an optional lookup (903) of shapes associated with a packet ID can be implemented. For example, when packet in ready list 612 is determined to begin testing, the shape indicated in that packet can be used to identify a plurality of related (e.g., child) shapes, and when those related shapes are identified, identifying information for them can be retained by packet unit 608 or by another functional unit. Then, when results return in a format like that of packet format 901, that repository can be indexed in order to identify the related shapes.

Alternatively, if the shapes are explicitly identified, such as by a format like that of format 902, then lookup (903) can be skipped. In either case, a plurality of shape identifiers (905) are obtained. Each can be hashed (910) and a number of bits from the hash value can be used to index collection memory 606 to identify a plurality of candidate locations for a ray collection associated with that shape ID. For example, collection memory 606 can be implemented a multi-way interleaved cache, and the indexing thus can provide multiple candidate locations for a collection associated with given hash value. Then, an entirety of the shape ID can be compared (917) with a shape ID stored in each candidate location to determine if the location stores a collection for that shape ID. If there is a matching shape ID, then it is determined whether the collection has a free slot (919), and if so then the rid ID from the packet is added to that location. This example is for collections with fixed sized, which is a preferred implementation, but collections also can be variably sized.

If there is not a free slot, then one of the collections identified as being in one of the matching locations is evicted (922), and a collection for the shape ID is created at the just-evicted, now free, location.

If there was no match (918), then it is determined whether any of the candidate locations is open (923), and if so then a collection is started (924) at that location. If there is no free location, then a collection is evicted (922) and a collection started for the new shape ID at that location. Thus, in some exemplary aspects, collection memory 606 can be managed in fixed size chunks where collections can be stored in a subset of available collection locations, based on hash values of identifiers for them. An eviction strategy can be implemented to ensure that a shape will be able to have rays collected against it. The eviction can result in collection identifying information being placed in ready list 612.

In some implementations, the eviction strategy can be tailored for achieving a variety of objectives that can be relevant in tracing/traversing rays in a scene. For example, an override mode 925 can be implemented in which one or more differing collection selection strategies (926) can be employed. Examples of such strategies are provided below. The override mode can be engaged at certain times or in response to certain conditions. In other examples, there need not be an explicit decision to change collection selection modes, and instead a set of collection heuristics can be employed that comprehend the objectives sought to be achieved in both the override and normal modes. Aspects of FIGS. 10A, 10B and FIG. 11 can bear on collection selection strategy, and therefore are addressed first.

Figure 10A:
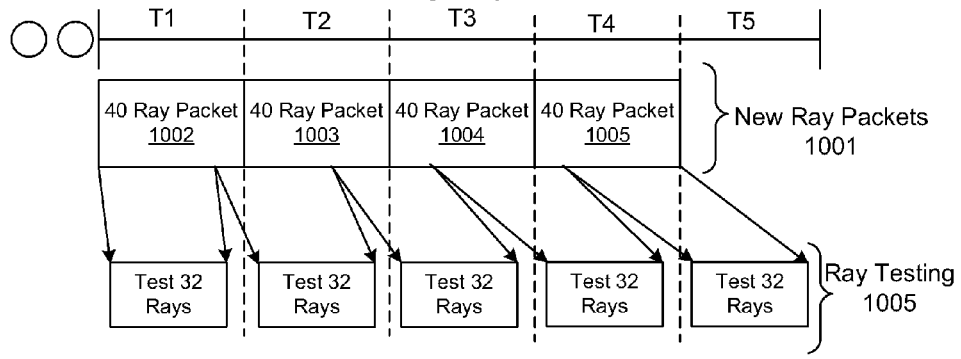
FIGS. 10A and 10B depict aspects of an example where packets contain a surplus of ray identifiers for available ray intersection tester resources.

FIG. 10A depicts a packet flow format in which timeslots T1 . . . . T5 are available. New ray packets 1001 in this example can identify up to 40 rays in each timeslot, while the intersection testing resources can test up to 32 rays in each timeslot, as depicted by ray testing 1005. FIG. 10A depicts a situation where a series of completely full packets 1002-1005 are provided for testing over timeslots T1-T4. Since the completely full packets contain 40 rays, intersection testing of 4 40 ray packets requires 5 timeslots. Thus, in timeslot 5, no new rays begin intersection testing.

With deeper buffers at an input to intersection testing (e.g., buffers 421a-421n), more ray packets can be received before intersection testing must begin to catch up. However, in other implementations, it is expected that the excess of ray identifier transmission capability to ray intersection testing capacity is to be used primarily to allow transmission of non-full collections, while keeping intersection testing resources saturated. Transmission of non-full collections, while maintaining saturation allows implementing of collection selection/eviction strategies that can be dynamic during intersection testing progress.

Of note is that FIG. 10A is depicted from the perspective of abstraction point 620, such that the packets are provided through abstraction point 620, but packet unit 608 does not have visibility to what rays were tested or not, or to which intersection tester each ray of a given collection was distributed.

Figure 10B:
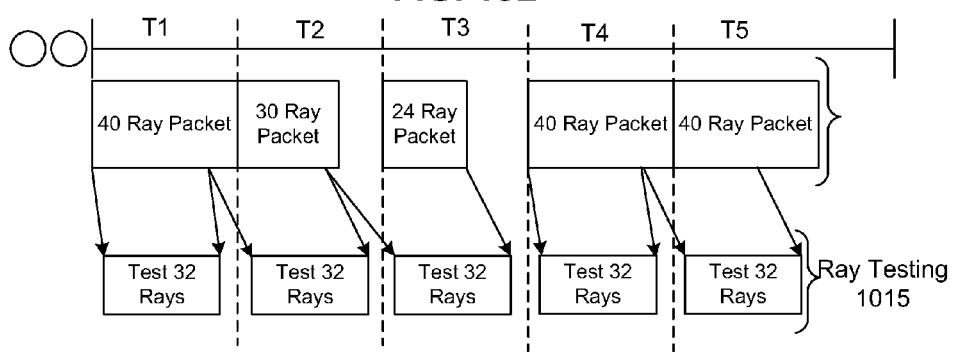

Such an example is depicted in FIG. 10B, wherein the same 5 timeslots are depicted. In T1, a 40 ray packet is transmitted, and 32 rays are tested, leaving 8 untested. FIG. 10B further illustrates that a 32 ray packet can be received in the T2 timeslot, while 32 rays are tested. Thus, of the 40 rays available for testing, 32 can be tested, leaving 8. In T3, a 24 ray packet is received, making 32 rays available for test, all of which can be tested in T3. In T4 and T5, 40 ray packets are received, while 32 rays are tested in each timeslot, such that 16 rays can be left over for testing in subsequent timeslots. In practice, buffering can be deeper that what was described here, such that even if some mostly empty packets were received, the buffers for each test cell (see e.g., FIG. 6) would have enough ray identifiers to test.

Figure 11:
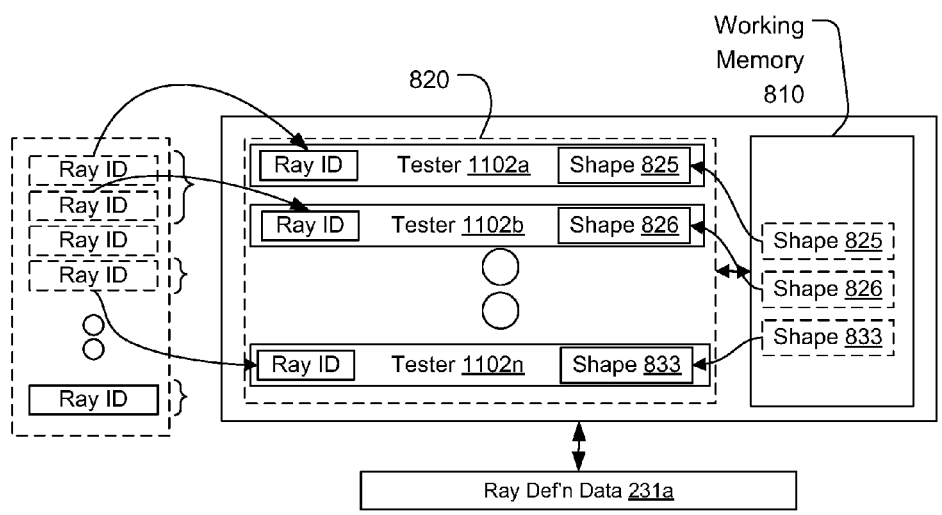
FIG. 11 depicts an example intersection tester architecture that can be used in disclosed examples.

FIG. 11 depicts further exemplary details of intersection tester 820 (FIG. 8). In the depicted example, intersection tester 820 may comprise a plurality of testers 1102a-1102n, each having access to working memory 810, and which stores data defining a plurality of shapes 825, 826, and 833. These shapes were stored in working memory 810 as a result of a memory fetch initiated by packet unit 608. Buffer 421a stores ray identifiers that have been received from a plurality of packets that were distributed through abstraint point 620. FIG. 11 depicts further that rays identified by a selection of such ray identifiers are loaded into respective testers 1102a-1102n from ray definition data storage 231a. As depicted, different of testers 1102a-1102n can test rays from different packets against different shapes.

In some cases, each tester 1102a-1102n can be implemented as a thread executing on a computation unit. Although each tester 1102a-1102n can test different rays against different shapes, the shapes and rays available for test in any of tester 1102a-1102n preferably is based on whether a given intersection tester (e.g., 405a-405n) has localized access to definition data for a particular ray. Further, since that particular ray is associated through collections with objects to be tested for intersection, both the ray identifiers and the shapes available in the testers is determined ultimately by packet unit 608. By contrast, a number of computation units executing freely on work scheduled independently would be accessing main memory in a more random pattern and with less efficiency.

As explained above, architectures according to the example of FIG. 4 or FIG. 6 can allow asynchronous control of when rays are presented for intersection testing, such that locality of object data against which the rays will be tested is substantially increased. it can be the case in intersection testing that packets can often be filled as these example architectures provide for deferral of intersection testing for rays, and in such cases, object data often can be streamed from main memory, as a large number of rays can be tested against a large number of objects. However, it can be desirable at times to schedule testing of packets that are less full.

For example, intersection testers can be designed to use collection storage of a given size, implying that either a maximum or approximate maximum of collections can be stored at a given time, or that a maximum number of active collections can be maintained in a faster memory, for example. As explained, rays can be collected against elements of an acceleration structure (e.g., a hierarchical structure). In some implementations, at each point in such a structure, there can be a relatively high fan out. For example, a given node in the structure can have 8, 10, 16, 24 or even 32 child nodes that are to be tested next for intersection. In turn, each of those nodes can have their own child nodes. Although it is generally desirable to disperse rays into a number of different collections, in order to increase ray diversity and identify more rays that can be tested against a common object (e.g., an acceleration element), such dispersal also can cause creation of too many collections that each need to be tracked.

Figure 12:
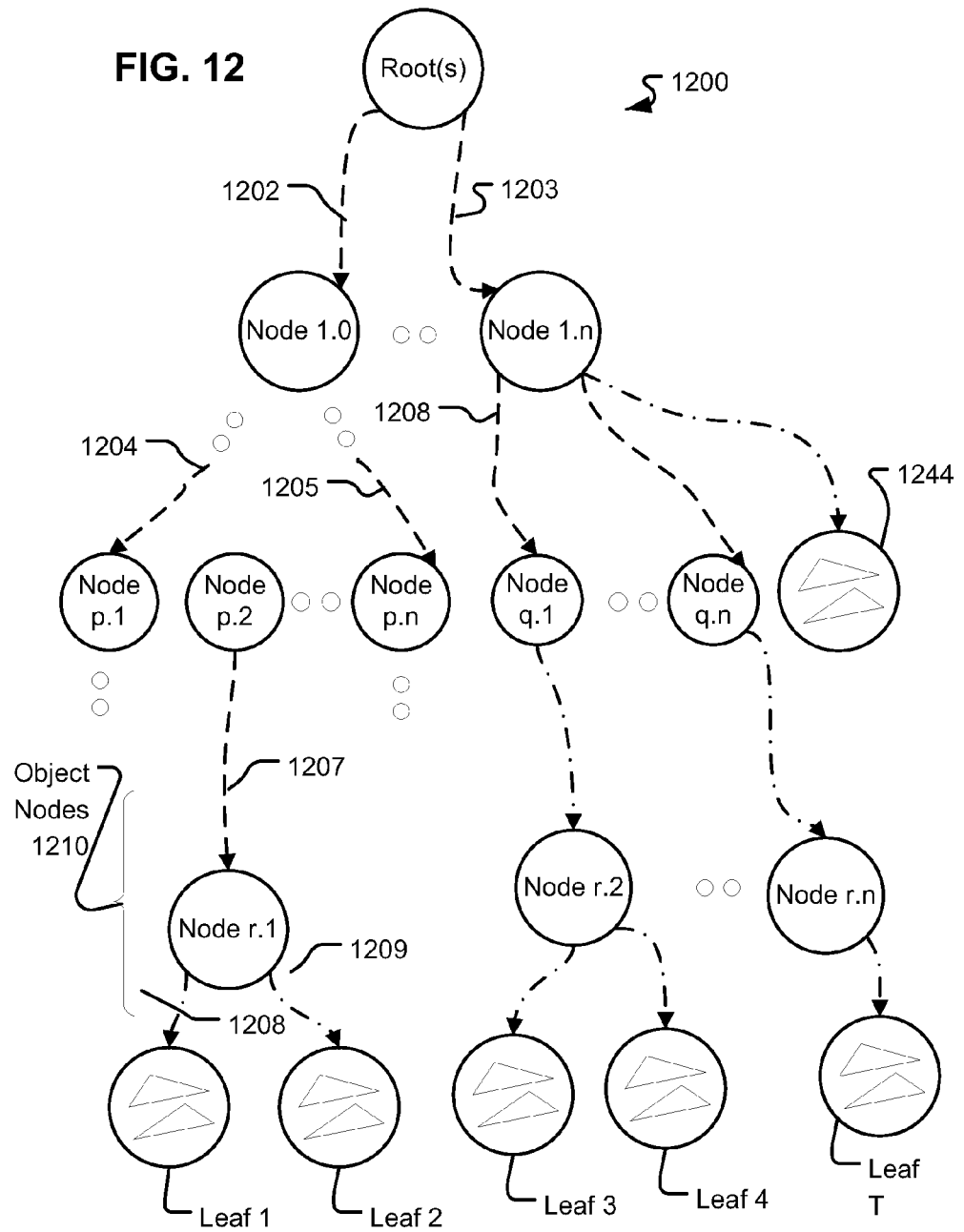
FIG. 12 depicts an acceleration structure for describing further aspects that can be implemented in ray tracing architectures.

More concretely and with reference to FIG. 12, it can be assumed that a number of rays are tested for intersection against children of a root node (identified as nodes 1.0-1.n), where node 1.0 is shown connected by edge 1202 to the root node, and similarly, edge 1203 connects node 1.n to the root node. FIG. 12 depicts also that acceleration structures can be heterogeneous, such that elements bounding primitives directly can be siblings with other elements (e.g., element 1244). Closer to the root node, it is often the case that nodes will fan out more widely, as illustrated that node 1.0 a has child nodes p.1-p.n, while node 1.n has child nodes q.1-q.n (there can be a number of intermediate connecting nodes). Eventually, acceleration structure 1200 narrows closer to nodes that bound primitives.

In this example, object nodes 1210 are provided, which each bound primitives that define a respective mesh associated with a different scene object (e.g., node r.1 can bound primitives associated with one object, while node r.2 can bound primitives associated with a different object). In turn, further acceleration elements can bound subsets of primitives of a given object (e.g, leaf 1 of node r.1), until finally leaf nodes are reached, which directly bound such primitives (e.g., leaf nodes 1-T).

In such an acceleration structure, it may be desirable to control which collections are tested for intersection in order to control a number of new collections that need to be formed as a result of such testing (avoidance of the explained exponent collection growth). In one example, such control can be effected by selecting collections for intersection that are closer to leaf nodes, even if they are less full than collections nearer the root node. It was explained that some packet formats can contain information about what where in the acceleration structure the object(s) with which they are associated are located. In some cases, this information can be a bounce count determined from rays accumulated in that collection. In other examples, this information can include object identifier information, where the object identifier can be numbered so that the number has meaning within the acceleration structure. Then, the numbers can be used in determining position in the acceleration structure, and hence whether a collection associated therewith has rays closer to test completion.

Thus, by selecting for test collections closer to completion, the intersection testing unit can control a degree of fan out during traversal of the tree, and encourage completion and freeing of collection space in memory. Since packets can oversupply the intersection testing unit, selection of less-than-full packets can occur while intersection testing still is completely saturated.

Figure 13:
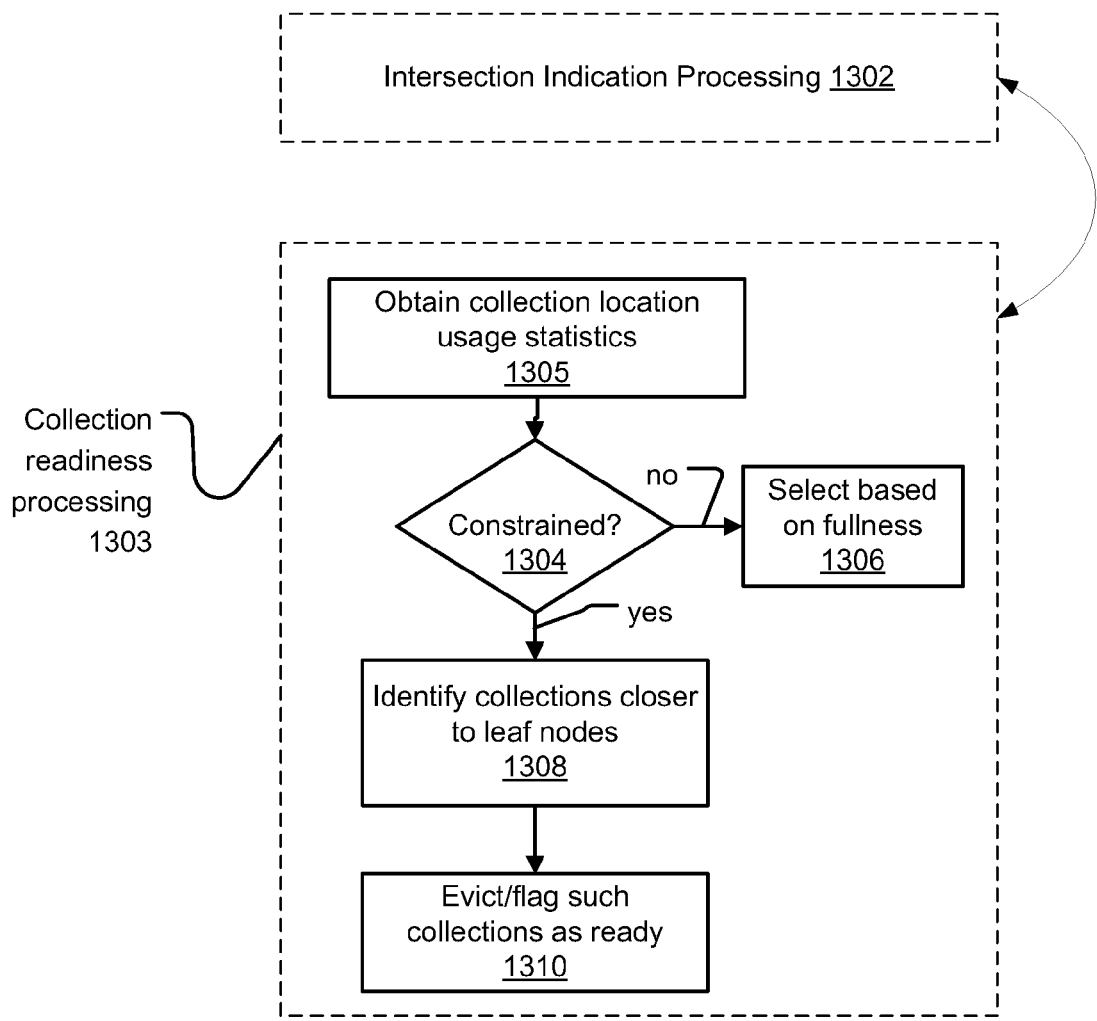
FIG. 13 depicts aspects of how collections maintained by packet unit can be selected to be tested, under different conditions detectable by the packet unit.

FIG. 13 depicts method aspects for implementing such an approach to ray tracing. FIG. 13 depicts that intersection indication processing 1302 communicates with collection readiness processing 1303. Intersection indication processing 1302 handles returning indications of intersections of rays and acceleration elements, and can be implemented, for example, in packet unit 608. Exemplary aspects of such processing also were explained with respect to FIG. 9, and include that rays indicated as having intersected an acceleration element are distributed among collections of ray identifiers. Collection readiness processing 1303 includes that status of the collections can be monitored 1304, such as by gathering statistics concerning memory usage, and/or fullness of the collections individually and/or in the aggregate. A decision can be made about whether the collection memory is constrained 1305, and in the absence of determining a constraint condition, collection selection 1306 for testing can occur based primarily on collection fullness (although there is no requirement that such decisions be made exclusively on that basis). Where a constraint condition was detected, collection can occur based also on which collections are closer to completion of traversal, which can include in some examples that the collections are closer to leaf nodes, or to another position in an acceleration structure of interest.

Then, any such identified or otherwise selected collections can be evicted or flagged as ready for test, and in the example of FIG. 8, can be stored in ready list 812.

Figure 14:
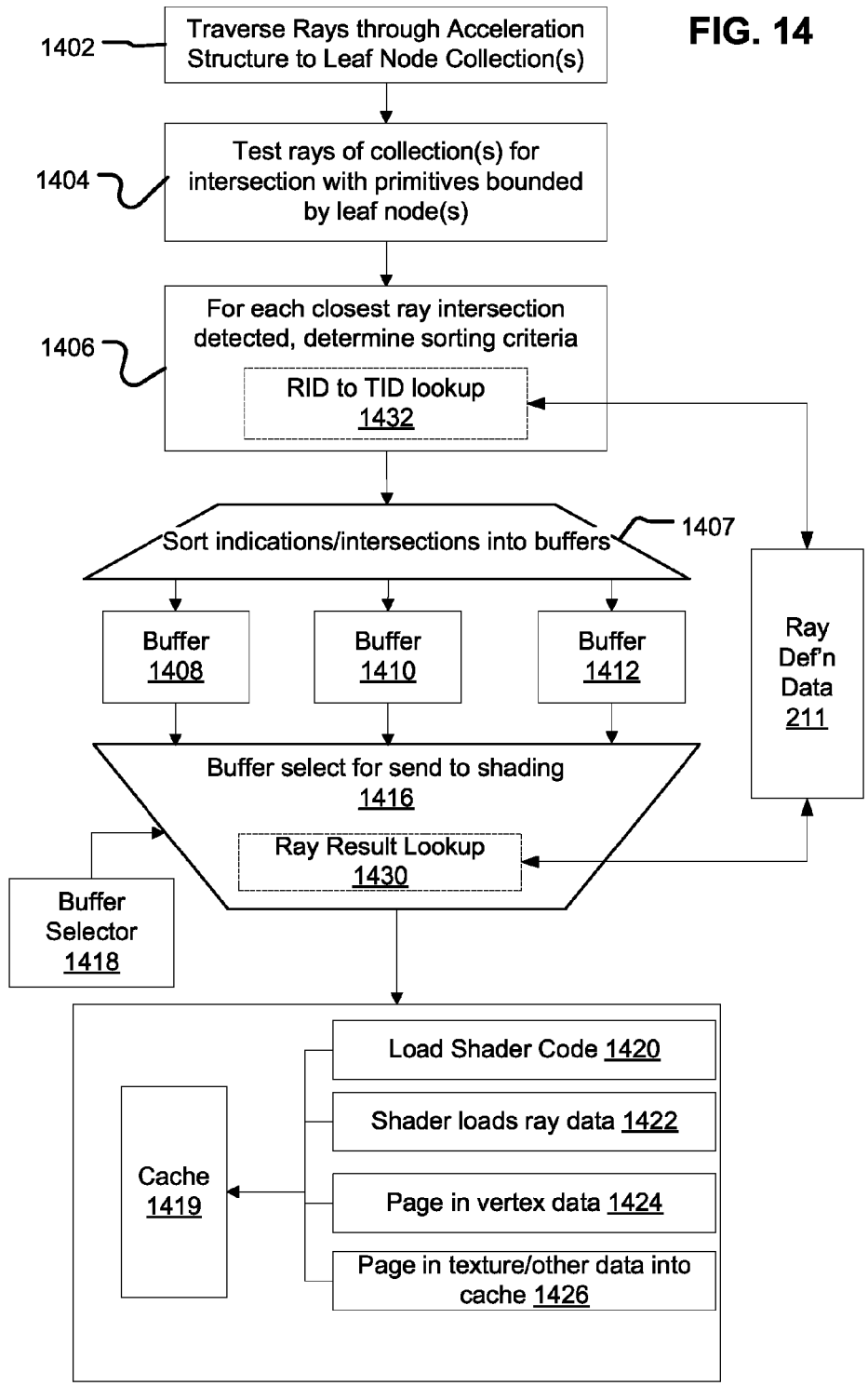
FIG. 14 depicts details of aspects relating to collecting intersecting rays by shader, or by intersected object, which is a component implementable in ray tracing architectures.

FIG. 14 depicts a aspects of a method that includes ray traversal, ray sorting, and preparation for shading. FIG. 14 depicts that rays can be traversed through an acceleration structure (e.g., that of FIG. 12). FIG. 14 also depicts that in one implementation, rays of collections(s) can be intersection tested by a bounding element (e.g., a leaf node) that can be considered as completing the traversal. Such an element can be a leaf node, or can be another node in the acceleration structure (e.g., a node bounding primitives associated with an object). In either case, the rays can be sorted based on a current possible closest detected intersection for that ray and the object containing that possible closest detected intersection. The sorting can provide for sorting ray intersection information, including identifiers for intersecting rays, based on an expectation that certain of the rays will use one or more of common shading code and common shading data during shading of their intersections. Such an expectation can be formed in ways such as determining that rays have intersected the same primitive, or have intersected different primitives of the same scene object.

It is to be noted that since this description comprises an approach wherein the traversal is stopped before final primitive intersection testing, the closest intersection is indicated as possible, since it can be the case that the ray ultimately may miss intersecting a primitive bounded by an acceleration element, even though it intersects that element.

In 1406, a sorting criteria can be determined. In one example, such sorting criteria includes using an identifier associated with each primitive. In another example, sorting criteria can include that a common shader, or a portion of a shader code module, and more generally, common data to be accessed and/or code are to be used and/or executed in shading the intersections. The sorting criteria can then be used in sorting the intersections. A function 1432 of using a ray identifier to lookup a primitive intersected by the ray (Triangle IDentifier (TID)) can also be employed, such that a datapath between ray intersection testing and sorting logic can be provided for ray identifiers, and a memory lookup function can be provided to obtain intersection information for identified rays, when required. The lookup can be made from ray definition data storage 211, which can be distributed among a plurality of intersection test areas (see e.g., FIG. 6).

In either case, sorting (1407) of intersections (or possible intersections) into object-associated buffers can be made based on the intersected information then-available (actual and/or possible intersections), and can be implemented by a sorter. Buffers 1408, 1410, and 1412 are depicted as example buffers for receiving intersection information sorted by object; such buffers can be implemented as FIFOs, ring buffers, linked lists, and so on. Other implementations can sort rays into buffers based on association with a particular code segment, such as a shader. In some implementations, sorting 1407 of rays into buffers associated with a particular shader or a particular object can be implemented using ray tracing deferral aspects described above. In some cases, primitives can each be given a unique number, some portion of which identifies a scene object to which the primitive belongs, and the sorting of the rays into various of the buffers can be based on a primitive identifier associated with the ray, or the scene object-identifying portion thereof.

A buffer selection 1418 can control from which buffer ray intersection information is obtained for conducting shading operations. Buffer selection 1418 can operate by selecting a fuller or fullest buffer from among buffers 1408, 1410, and 1412. In some cases, buffer selection 1418 can select any buffer having more than a minimum number of rays collected therein (collecting rays preferably refers to collecting identifiers for the rays, but also can include collecting definition data for the rays in the buffers). In some examples, a ray result lookup function 1430 can be provided for implementations where buffers 1408-1412 store ray identifiers, but not all data that would be used to identify a particular intersection, such as a primitive identifier.

In one example, rays can be collected by object, and shader code associated with that object can be loaded 1420, and stored, such as in cache 1419. Shaders further can load (1422) definition data for rays identified in the data read from the selected buffer(s). Vertex attribute data for the object(s) associated with rays from a selected buffer can be paged (1424) from memory. Further during execution shader code loaded for the object can sample texture and other data useful in shading of ray intersections. The collections maintained in buffers 1408, 1410, 1412 can be larger, and in some cases much larger than collections maintained with respect to nodes of the acceleration structure. For example, each buffer can hold 256, 512, 1024, 1096, 2048, or more or fewer ray intersection indications.

Buffering approaches can include including buffer segments of a comparatively small size, such as 128 entries and linking them as needed for a larger buffer. Still further approaches can include having a plurality of buffer sizes, and selecting a buffer size based on a number of primitives composing a shape to be associated with the buffer. For example, a shape associated with 250 k primitives can be associated with a smaller buffer than a 1M primitive shape. Buffer sizes can be created based on an analysis of the scene and the objects composing it. For example, if the scene has a distribution of many smaller objects, than more smaller buffers can be allocated; conversely, if there are fewer larger objects in the scene, then fewer larger buffers can be allocated.

Although a buffered approach was described above, aspects of ray sorting and collection described herein do not require such buffering. For example, groupings of ray information for which intersections have been determined can be outputted immediately after intersection testing, without an intermediate buffering. For example, in some cases, intersection testing resources can concurrently test 32, 64 or more rays for intersection with selections of primitives that can be related to, or part of, the same scene object. Any rays found to intersect from that concurrently testing can be outputted as a group, without buffering, such as buffering to await more rays intersecting the same object. In other implementations, buffering can be used to aggregate hundreds or even thousands of rays for outputting to shading.

In some cases, system implementations can include a software or hardware implemented function that allows a lookup of what triangle was intersected by a given ray. For implementations that provide such a function, the buffers need not store the triangle identifier with the ray or ray identifier, and instead, a lookup can be conducted using the ray identifier when the ray is ready to be shaded.

In the above aspects, it is preferred to page in a relatively large section of vertex attributes and maintain that data in cache while a number of ray intersections are shaded using portions of the paged-in vertex data (and other data).

The figure above depicts both functional elements of methods and structural elements of systems according to the description. For example, the testing 1404 can be implemented by structure and systems according to the examples of FIGS. 2-5.

Figure 15:
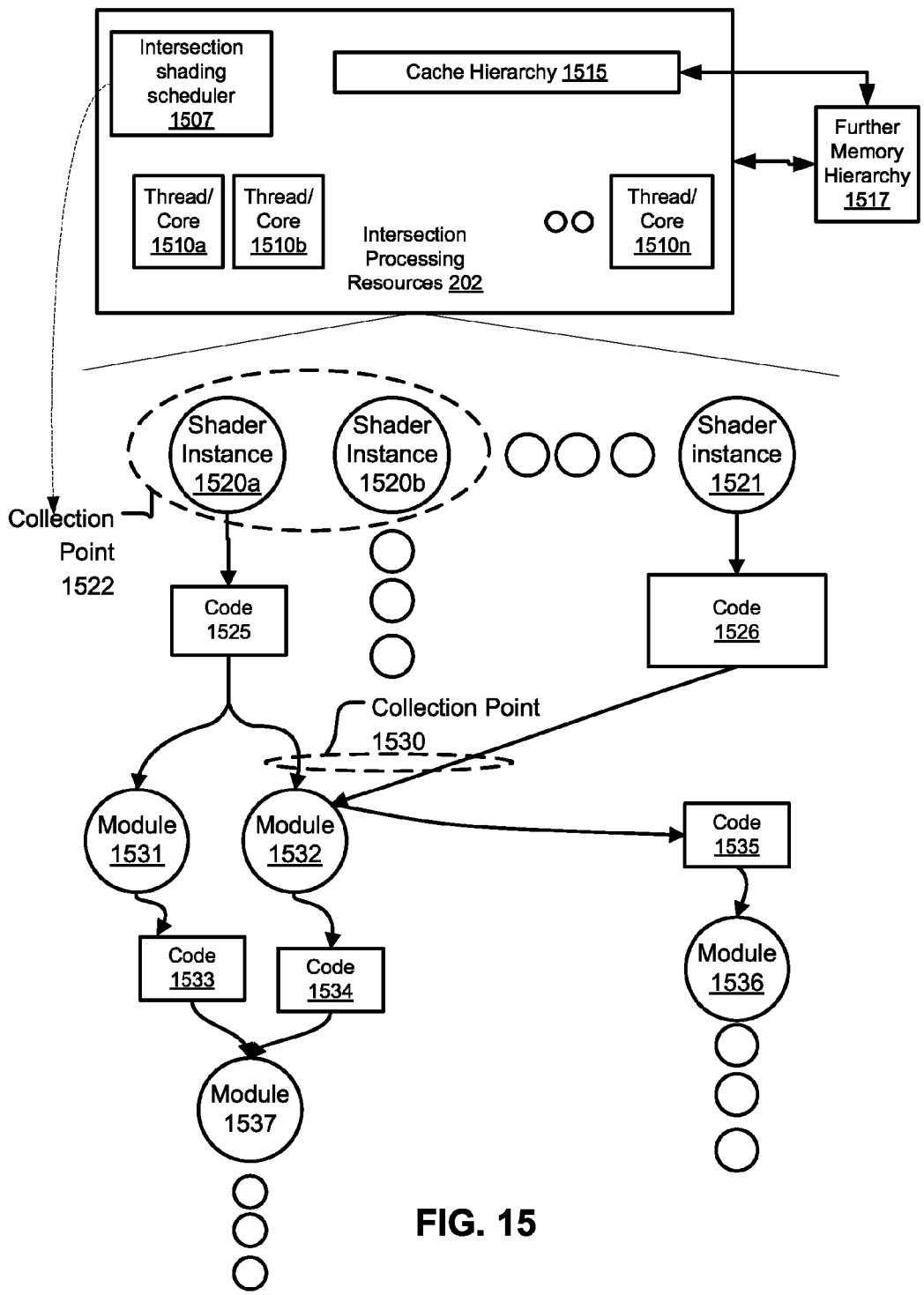
FIG. 15 depicts data flow aspects relating to collecting and shading of collected rays based on intersected object and more granular shading code components.

FIG. 15 depicts further examples of how ray collections can be grouped based on object intersection information, or at a more granular level based on portions of shader code being executed. FIG. 15 depicts intersection processing resources 202 that can comprise a plurality of execution cores (threads) 1510a-1510n, an intersection shading scheduler 1507, and a cache hierarchy 1515 that can comprise a plurality of cache memories. In this example, cache hierarchy 1515 can comprise a plurality of caches located on-chip, and/or within a module in which execution cores 1510a-1510n are located. Further memories 1517 can be accessed off-chip. Intersection processing resources 202 can execute shader code in execution cores 1510a-1510n, and in this particular example, shader instances 1520a and 1520b are depicted, which are differences instances of the same shader. Shader instance 1521 is also depicted as an instance of shader code for a different shader.

Scheduler 1507 can create points of aggregation at which rays can be collected to defer their shading in favor of shading collections of other rays. Collection point 1522 depicts a logical view that shading scheduler 1507 can aggregate rays to await execution of the two depicted shader instances 1520a and 1520b (depicts an entrance point of such shader code). Thus, as rays are deferred, they are collection into a collection associated with collection point 1522. When the collected rays are to be shaded, data useful in their shading can be paged into cache hierarchy 1515 (as explained with respect to FIG. 14).

FIG. 15 also depicts that shaders may comprise multiple sections of code, and may also branch and call other modules of code. For example, code 1525 is depicted as code that was branched to during execution of shader instance 1520*a*, but not shader instance 1520*b*. Modules 1531 and 1532 are examples of modules, such as a diffuse lighting modules that can be called by shaders. A collection point can be provided by scheduler 1507 to collect rays of shader instances that have made calls to such modules. For example, collection point 1530 represents collecting rays that have called module 1532.

As depicted, such calls can come from instances of different shader code (here, instance 1520*b* and instance 1521). Once module 1532 has been executed for rays collected at collection point 1530, shaders continue in their normal shading path. For example, rays collected from module 1532 can return to execute code 1535, and call module 1536, after completion of module 1532. Similarly, shader instance 1520*a* had two taken branches in which module 1531 is executed for some rays while module 1532 was executed for other rays. Collection point 1530 applied only to module 1532, such that for those intersections that took the module 1531 branch, they would execute code 1533, and ultimately converge to the same code path at module 1537, as would those intersections that took module 1532, executed code 1534 before converging at module 1537. FIG. 15 is only exemplary at scheduler 1507 can provide a variety of collection points, within shader modules, based on calls to provided modules, based on access to defined regions of memory that have been loaded with object data for certain objects or object portions, and so on. In one preferred aspect, ray intersection processing can be collected at a start of diffuse lighting calculations, such that diffuse lighting calculations can proceed for a number of rays that intersected portions of the same object, and in other examples, rays that intersected portions of the same or different object, and whose shaders use a diffuse lighting call can be collected.

The above examples explained sorting responsive to detection of intersections with primitives (one example). In addition to sorting based on detected intersections, each ray also can be associated with a default bin or buffer in which it is to be sorted, absent a detected intersection. The specified bin or buffer can be a bin or buffer that also is associated with one or more primitives, or objects, or particular code modules, such that some rays end up there by virtue of their respective default assignment, while others end up there as a result of detecting an intersection that causes that ray to be binned or buffered there. Therefore, although the prototypical example is sorting/buffering/binning based on detected intersections, examples also can provide functionality that allows each ray to specify a default. An API call allowing ray emission can be made to accept that default assignment.

Figure 16:
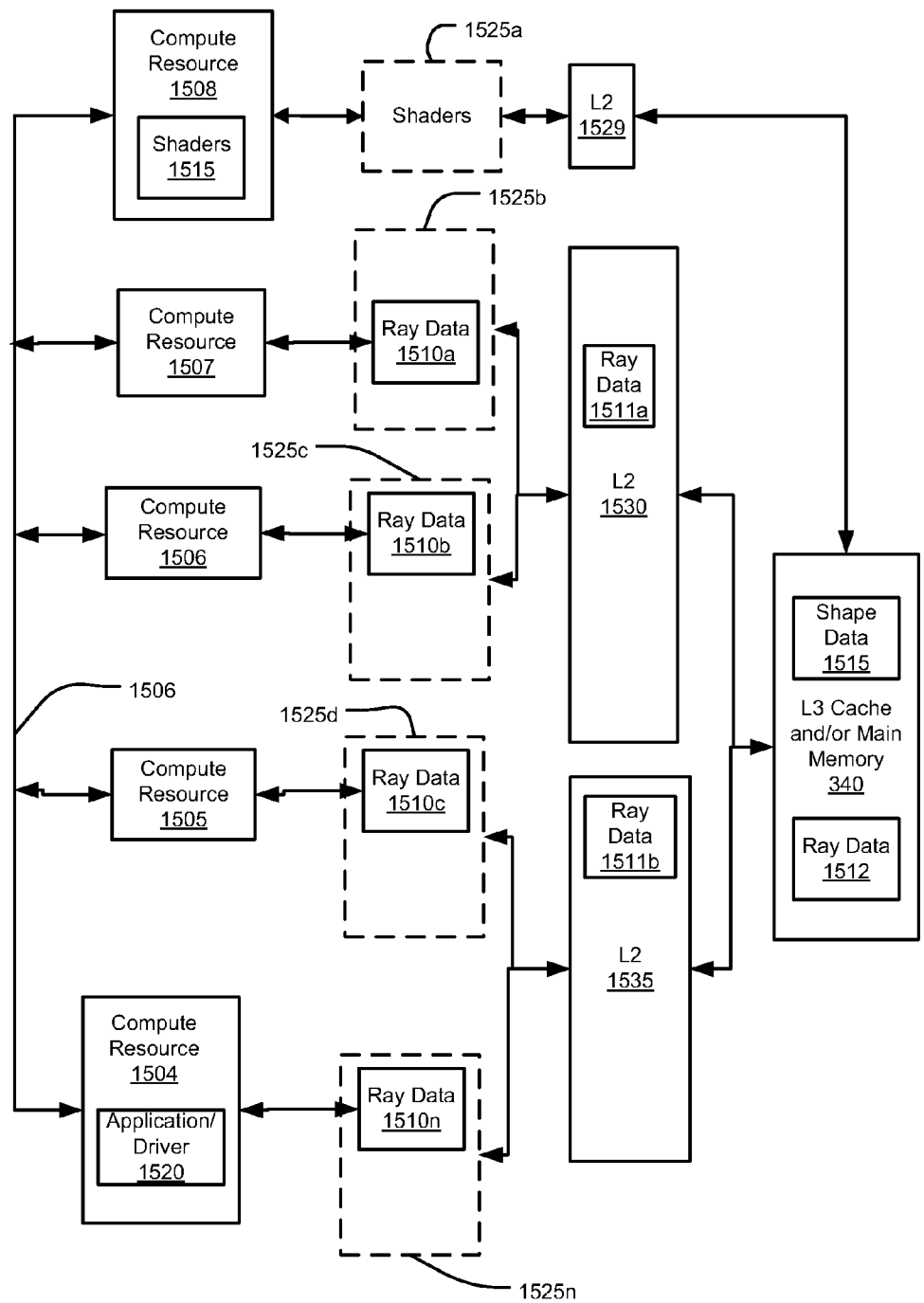
FIG. 16 depicts components of a system that can be used in implementing ray tracing aspects disclosed with respect to previous figures.

Combinations of approaches to both examples can be implemented within one system. A system example in which such aspects can be implemented in depicted in FIG. 16.

By way of further summary, systems according to these examples can more broadly operate to allocate resources between driving intersection testing into further areas of a scene structure, and to produce a wider variety of rays and to starting new camera rays. Ultimately, it is expected to test all rays emitted by the shaders that execute, but an order of execution can have important effects on memory usage during rendering.

Any of the functions, features, and other logic described herein can be implemented with a variety of computing resources. Examples of computing resource(s) include a thread, a core, a processor, a group of processors, a virtual machine, a fixed function processing element, and the like. Thus, various approaches, aspects of methods, processing components, and the like were described, and such computing resources can provide means for implementing these functions. Also, other functions that may be used in implementing embodiments can be provided or implemented as a process, thread or task that can be localized to one computing resource or distributed among a plurality of computing resources (e.g., a plurality of threads distributed among a plurality of physical compute resources).

By particular example, computing resources being used for intersection test can also host other processes, such as shading processes that are used to shade intersections detected. By further example, if a core can support multiple threads, then a thread can be dedicated to shading while another thread can be dedicated to intersection processing.

As discussed above, the described examples can be used in transforming a 3-D scene into a 2-D representation of it, as viewed from a defined vantage point. The 3-D scene can include data representations of physical objects. Other results of ray intersection testing can include object visibility determinations, which can be used in a variety of applications. Other transformations include transforming computer readable media into a different state by storing data determined according to the defined methods.

The above workflow and method examples in preparation for rendering and the rendering itself can be performed in a system 1600 that may comprise a plurality of computing resources 1604-1607. Computing resources 1604-1607 may comprise any one or more of a plurality of processing cores, processors, that can each comprise fixed function and/or programmable elements. The computing resources 1604-1607 may also comprise different threads of computation on a multi-threaded processor, for example. Each of computing resource 1604-1607 may have read and write access to a respective L1 cache 1625*a*-1625*n*, that can be integrated with its computation resource or separate. A plurality of L2 caches, e.g., L2 cache 1630 and L2 cache 1635, can be provided and can be shared among the computation resources or private. A shared L3 cache and/or a main working memory 1640 can be provided. In this example, ray data 1610 and shape data 1615 can be stored in L3/main memory 1640. The example system 1600 can execute one or more applications and the scene builder workflow, e.g., application/builder 865. The computation resources can communicate with each other over a shared bus 1601, or using point to point connections, or through shared memory space in the L2 caches 1630 and 1635 or L3/main memory 1640.

In one application, these systems and methods can be used in rendering representations of a 3-D scene for use in holographic imaging systems. In an example approach to rendering for holographic imaging systems, a plurality of images of a given scene are to be rendered, each from a different perspective. In rendering such images, each perspective can be considered to be an origin of rays to be intersection tested. The rays of each perspective can be collected together for intersection testing, such as collecting rays of different origins and their progeny together, without regard to their origins, but rather with respect to commonality of intersection testing and/or shading to be performed. Allowing collection of rays from a plurality of such origins allows systems and methods to provide for setup of the 3-D scene once, so that such scene setup is amortized over a large number of image renderings. Also, combining rays to be traced from different origins may allow for greater coherence and overall processor utilization. Thus, in the above examples, where collections of rays are formed, outputted, or otherwise handled according to the disclosures, these rays can be attributed to a plurality of camera positions. For example, rays of a given collection can be tested against child nodes of a parent node of a common acceleration structure.

Another application of these disclosures comprises determining mappings between data elements of a first type, which can be defined during execution of a computer-implemented process to data elements of a second type, which comprise code modules that can use information provided in elements of the first type during execution of the process. In other words, as between a number of discrete potential inputs to a number of discrete potential code modules, an application comprises determining, based on characteristics of the potential inputs and characteristics of the code modules, which code module is to receive which input. In such applications, code modules can generate further potential inputs, for which the determination is to be conducted again. Thus, in some such applications, a complete dataset to be processed is developed or otherwise evolved during execution of the application itself.

By way of contrast, some classes of processes may have an entirety of possible actions to be taken specified prior to initiating the process; for example, code modules that accept data elements used as inputs in the code modules can be specified prior to execution of a program or process that uses the code modules. However, in the present circumstances, which actions are to be taken (or code modules executed, in a more specific instance), and under what circumstances those actions are to be taken, may be indeterminate prior to initiation of the process or even at any given point during the execution of the process. Instead such information is determined during iterations of process execution. As such, in some examples, an entirety of the data set used during execution of a process may be indeterminate at commencement of the process. Also, it may be indeterminate which code modules (or functional modules) of the process will use which portions of the data set. A fine grained parallelization of execution of such processes at compile time is difficult, because the order of execution of code modules, and which code modules may use which inputs is unknown at that time.

Therefore, systems and methods that can determine and schedule processing for portions of a data set that evolves over the course of execution of a process to take increased advantage of available parallelism are desirable. In one particular process category, there can be one type of data element, where different instances of that data element can have different parameters, and each parameter can have different values. Different data elements can have different parameters, even if there is a superset of parameters from which the parameters associated with any given data element can be chosen.

These data elements can be used as input to code modules that may use parameters of these data elements as inputs, and can also instantiate new data elements as outputs of execution. When data elements are instantiated, they are to be closed either by determining that they cause no further code executed, or an appropriate portion of code to be run for each of them is identified (and executed, depending on how the closure is defined).

A preliminary setup for executing the process includes establishing an n-dimensional space in which code portions (e.g., code modules or portions of a module) can be interrelated or organized by associating the code portions with one or more points or locations in the n-dimensional spatial structure (such code portions also can be associated with defined regions in n-dimensional space, but preferably, they are associated with points, and the description uses this example, without limitation).

The n-dimensional space can be sub-divided by an acceleration structure comprising a plurality of elements, where each of the elements establishes a hypersurface (for convenience, called a surface—as in a 3-D structure) that bounds a respective selection of points associated with respective code portions. In some examples, the acceleration structure is hierarchical, with child elements of parent elements (this example will be used below, for ease of description, but hierarchy in the acceleration structure is not required). Typically, parent acceleration elements bound supersets of the points bounded by their children, but do not necessarily bound the entirety of the surfaces of the child elements themselves.

A plurality of data elements are defined (or obtained), for which processing may need to be conducted. A search in the n-dimensional space is to be conducted to determine one or more code modules that are to be run for closing processing of those data elements (and in some more general cases, whether any processing is to be done for a given element). The search is to be conducted based on criteria specified in the data element, which comprise one or more parameters whose permissible range of values define a path or region in the n-dimensional space. For example, in the case of rays as data elements, parameters can comprise an origin and direction specified in 3-D space, which define a line in 3-D space. Similarly, parameters may define a 3-D object, such as a sphere. An arbitrary path of a point through space, or of an extrusion of a 2-D surface are other examples. Hyperdimensional regions can be defined by regular or irregular bounds in the n-dimensional space. The region can be contiguous or non-contiguous, e.g., the region may comprise a union of a plurality of disjoint portions of n-dimensional space. Thus, a data element defines a spatial extent in the n-dimensional space, where n can be two or more; the spatial extent depends on the parameters and values of the parameters defined for a given data element ("spatial" is used here for increased understanding, and without limitation as to a number of dimensions in the operational space).

To determine what code portion(s) (if any) are to be run for a given data element, the spatial extent for that data element is tested for intersection in the n-dimensional space with surfaces (hypersurfaces) defined by elements of the acceleration structure. As data elements are found to intersect surfaces of acceleration elements, those data elements are collected into collections associated with those acceleration elements.

The searching can be done in a computation resource that comprises a plurality of test elements, such as threads, or dedicated test cells, that can test different data elements for intersection with a given surface (one example). This computation resource is limited in that it cannot concurrently perform all intersection testing that must be done, so this computation resource is to be scheduled. The allocation of the computation resource for the testing is based on scheduling collections of data elements for further testing, from a pool of collections. Rather than testing the data elements in an order in which they were defined or began testing, the data elements are tested based on membership in collections selected from the pool. Data elements can concurrently exist in multiple collections, and can be tested by virtue of membership in one collection, even while testing based on membership in a different collection is deferred.

The deferral of some collections in favor of other collections provides for further collections to be traversed to join collections in the acceleration structure that have less full collections, such that, in general, data elements from fuller collections can be tested concurrently (heuristics for collection scheduling can include selecting collections having other characteristics in some circumstances). In the case of a hierarchical acceleration structure, a collection of data elements would be tested next with children acceleration elements of the acceleration element to which the given collection of data elements was associated.

In the case of ray intersection testing, the interesting result typically is a closest intersection from an origin of the ray being tested. However, for a more general case of intersection testing of spatial extents defined by a parametric definition in a data element (in n-dimensional space), a plurality of results can be returned, or a selected result, or an ordering of results. As such, the results to be returned, and a format thereof, can be specified by provision of a format to which a data element query can be formatted.

Outputs from such testing can include indications of which data elements are to be used as inputs to (or triggers to execute) to which code portions. Such data elements also can be outputted as a collection, such that a number of the instances of the same or related code portions can be provided for different of the data elements. In turn, outputs of the code portions can include further data elements for which the described searching is to be conducted.

In addition or separate from the above, scheduling of execution of the code portions themselves can include parallelizing the execution of the code portions for different of the data elements, such that common portions of the code can execute concurrently for different of the data elements. Also, other data (e.g, data other than what may be included within the data elements themselves) used by the code portions can be retrieved and cached for use.

Thus, systems according to the above examples can implement methods where data elements comprising a plurality of parameters whose values define a region in an n-dimensional space can be tested for intersection with hypersurfaces that bound points (or regions) in space which are associated with modules of code for execution. The data elements found to intersect such hypersurfaces can carry data which can be used as input to one or more of the code modules bounded by an intersected surface. In some examples, system can perform further testing to establish a nearness or intersection to a specified degree of precision between the region defined by a given data element and a point associated with a given code module. Testing of a plurality of data elements preferably is performed concurrently in systems by deferring further testing of individual data elements to accumulate a number of data elements found to intersect a given hypersurface and scheduling other accumulated data elements for testing on provided system resources.

Computer code and associated data can be provided for implementing methods and other aspects described herein. The computer code can comprise computer executable instructions that may be, for example, binaries, intermediate format instructions such as assembly language, firmware, or source code. The code may configure or otherwise cause to be configured a general purpose computer, a special purpose computer, or a special purpose processing device to perform a certain function or group of functions.

Any such code can be stored in computer readable media, such as solid-state drives, hard drives, CD-ROMs and other optical storage means, transiently in volatile memories, such as DRAM, or less transiently in SRAM.

A variety of implementations can be provided which can include interoperative hardware, firmware and/or software that can also be embodied in any of a variety of form factors and devices, including laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

For example, machines for according to these examples can comprise intersection testing resources including particular fixed-purpose testing cells, and/or general purpose computers configured with computer readable instructions from a computer readable medium to perform the particular intersection tests described and interpret the results of the tests. Further machine components include communication links for providing the acceleration structures to the testing resources and to receive the results of the testing. The machines for intersection testing can be a component of a larger system including other input and output devices, such as a drive for reading scene description data, and a display or a computer readable medium for outputting rendered scenes. For example, the computer readable medium can be a DVD and each scene may be a frame of a motion picture.

In all of the above examples, the 3-D scene being rendered can represent an abstraction or a model of a real-world scene and the rays being tested also can represent light energy being emitted from lights located in the scene. Similarly, the usage of the camera also can represent a vantage point of an observer for the scene. The output of intersection testing results in determining how light affects the scene and ultimately affects output that can be consumed by other applications, can be stored in computer readable media, and can be displayed to a user.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

The invention claimed is:

1. A system for use in ray-tracing-based 3-D scene rendering, comprising:
   an intersection tester comprising:
      an access port to a memory storing definition data for a plurality of rays to be intersection tested in a 3-D scene,
      one or more test cells operable for testing rays of the plurality for intersection with one or more of (1) primitives composing the 3-D scene and (2) elements of an acceleration structure each identifying respective selections of the primitives, and
      an output buffer, comprising a memory, coupled for receiving indications of detected intersections between rays and respective primitives, the output buffer configured for storing the received indications pending a block output of at least some of the stored indications; and
   a processor coupled for receiving the block output of stored indications from the output buffer and executing shader modules comprising code to be executed.

2. The system of claim 1, wherein the output buffer comprises a plurality of buffer portions, and the intersection tester comprises a sorter coupled to the output buffer configured for sorting the indications of detected intersections among the buffer portions, based on commonality of shading code to be run for shading the detected intersections.

3. The system of claim 2, wherein the block output comprises the indications stored in a buffer portion.

4. The system of claim 1, wherein the indications stored in the output buffer each comprise a ray identifier.

5. The system of claim 1, wherein the block output comprises identifiers for rays and closest detected intersection information for those rays.

6. The system of claim 1, wherein the primitives are each identified with respective identifiers, each indicative of a scene object of which that primitive is a part, and further comprising a sorter coupled with the output buffer and operable to use primitive identifiers for sorting ray identifiers associated with the primitive identifiers into a plurality of buffer portions comprising the output buffer.

7. The system of claim 1, wherein the block output is representative of one or more groupings of identifiers for rays that may need to have common portions of code executed for shading; and the processor is configured by one or more of those common portions of code for shading prior to execution of those common code portions as the shader modules for shading ray intersections of the one or more groupings.

8. The system of claim 1, wherein the processor is operable for block retrieval of shading data responsive to block output of stored indications, and for storage of the shading data in a cache for local access during shading of the indicated intersections.

9. The system of claim 1, wherein contents of the output buffer indicate plural detected possible intersections for a given ray, and the system is configured for performing final intersection testing among those detected possible intersections to identify an actual intersection for that ray prior to executing one or more shader modules comprising code to be executed for that actual intersection.

10. The system of claim 1, further comprising a controller operable to make collections of rays, at least some of the collections associated with respective scene objects composing the 3-D scene.

11. A machine-implemented method pertaining to 3-D scene rendering with ray tracing, comprising:
providing shapes comprising scene objects in a 3-D scene to be rendered, the objects composed of primitives, and an acceleration structure comprising elements that bound selections of the primitives;
defining a plurality of rays to be processed, the processing for each ray comprising identifying a respective closest intersection, if any, with the primitives and shading such an intersection by executing one or more code modules; and
performing the processing for each of the rays, the performance of the processing scheduled by making collections of the rays based on outputs produced during processing, each ray being concurrently collectible into a plurality of the collections, represented by data stored in a tangible memory, each collection associated with at least one of the shapes, and selecting rays for performance of further processing by selecting one or more collections to which those rays belong.

12. The machine-implemented method of claim 11, wherein collections are associated with a shape by collection into a collection associated with an acceleration geometry element bounding at least one primitive composing that shape.

13. The machine-implemented method of claim 11, wherein the code modules for execution are determined by which primitive was intersected.

14. The machine-implemented method of claim 11, wherein the identifying a respective closest intersection, if any, with the primitives results in outputting an association between a unique primitive identifier and the ray.

15. The machine-implemented method of claim 11, wherein the providing of the shapes comprises providing an identifier for each of the primitives composing the scene objects, a portion of each identifier identifying the scene object to which the primitive belongs.

16. The machine-implemented method of claim 11, further comprising, after identifying a closest primitive intersection for a number of the rays, sorting those rays based on scene object.

17. The machine-implemented method of claim 11, wherein the sorting uses a respective unique identifier associated with each of the primitives, which also can be used to identify the scene object of which the primitive is a part.

18. The machine-implemented method of claim 11, wherein the identifying of the respective closest intersection comprises traversal of an acceleration structure that sub-divides a 3-D scene, resulting in possible identification of subsets of primitives composing the 3-D scene, against which the rays are to be tested for intersection, and testing each ray against its respective primitive subset for a closest intersection, if any.

19. The machine-implemented method of claim 11, wherein the performing of the processing comprises deferring further processing of individual rays until determining that a ray collection is ready, and then performing a subsequent iteration of processing for rays of that ready collection.

20. The machine-implemented method of claim 11, wherein the performing of the processing takes place in a plurality of iterations and the iterations comprise one or more iterations wherein rays are collected into collections that are each associated with a scene object.

21. The machine-implemented method of claim 11, wherein the ray collections are formed from identifiers for the collected rays.

22. The machine-implemented method of claim 11, wherein associating ray collections with shapes is performed for one or more of traversal of the acceleration structure and for outputting information for rays that have completed intersection testing.

23. The machine-implemented method of claim 11, wherein the outputs produced during processing comprise a determination that a common portion of shading code is to be run for a plurality of the intersections.

24. A component for a ray tracing system, comprising:
an input for receiving identifiers of rays that have been found to intersect a primitive composing a 3-D scene being ray traced;
a plurality of buffers implemented in one or more tangible memories;
a sorter coupled to the plurality of buffers and to the input and operable to disperse the ray identifiers among the plurality of buffers for storage, grouping the identifiers for rays that are expected to require one or more of common shading code and common shading data for shading their respective intersections; and
an output, coupled with the plurality of buffers, for sending contents of a selected buffer to a computation resource- to be configured for shading intersections for the rays identified by identifiers stored in the selected buffer.

25. The component of claim 24, wherein the sorter is operable to use an identifier for a primitive intersected by each ray in determining whether one or more of common shading code and common shading data will be used during shading of intersections for different rays.

26. The component of claim 25, wherein the primitive identifiers each include a portion that identifies an object of which that primitive is a part, each object associated with one or more of respective shading code and shading data, such that rays hitting that same object are expected to have intersections shaded with one or more of common shading code and common shading data.

27. A tangible computer readable medium storing instructions for implementing a process for providing a ray tracing system, comprising:
provide an intersection testing resource operable for concurrent intersection testing of a plurality of rays in a 3-D scene, resulting in identification of detected valid intersections for at least some of the plurality of rays;
providing an intersection shading resource for configuration to run shading code for shading detected valid ray intersections; and
providing for communication between the intersection testing resource and the shading resource, the communication implemented by outputting one or more groupings of information for the detected intersections, the groupings determined based on an expectation that each intersection of each group will be shaded with one or more of common shading code and common shading data.

28. The tangible computer readable medium of claim 27, wherein the process provides communication between the intersection testing resource and the intersection shading resource through buffering operable to collect information for detected valid intersections from a plurality concurrent intersection tests involving different rays, the buffering storing the groupings of information pending a selection of a grouping for output.

29. The tangible computer readable medium of claim 27, wherein the information comprised in the groupings comprises ray identifiers.

30. The tangible computer readable medium of claim 27, wherein the groupings are formed by sorting rays based on identification information for respective primitives they intersected.

31. The tangible computer readable medium of claim 27, wherein the process further comprises providing for buffering of new ray data from the shading resource to the intersection testing resource, the buffering of new ray data comprising collecting new ray data from a plurality of shader code modules for initiation of concurrent intersection testing of those new rays.

32. The tangible computer readable medium of claim 27, wherein the process further comprises providing control scheduling of one or more threads to function as the shading resource for executing the common shading code.

33. The system of claim 1, wherein the processor implements the intersection tester.

34. The system of claim 33, wherein the test cells comprise one or more of fixed function hardware and programmable portions of the processor configured for testing rays of the plurality of intersection.

* * * * *